(12) United States Patent
Lopez Menendez

(10) Patent No.: US 11,664,179 B2
(45) Date of Patent: May 30, 2023

(54) DETACHABLE KNOB FOR ACTUATING SWITCHGEAR, AND A SWITCHGEAR DEVICE INCORPORATING THE DETACHABLE KNOB

(71) Applicant: Gorlan Team, S. L. U, Amorebieta (ES)

(72) Inventor: Israel Lopez Menendez, Amorebieta (ES)

(73) Assignee: GORLAN TEAM, S.L.U, Amorebieta (ES)

( * ) Notice: Subject to any disclaimer, the term of this patent is extended or adjusted under 35 U.S.C. 154(b) by 162 days.

(21) Appl. No.: 17/203,603

(22) Filed: Mar. 16, 2021

(65) Prior Publication Data

US 2021/0313126 A1    Oct. 7, 2021

(30) Foreign Application Priority Data

Apr. 1, 2020    (EP) ..................................... 20382263

(51) Int. Cl.
*H01H 19/14* (2006.01)
*G05G 1/12* (2006.01)
(Continued)

(52) U.S. Cl.
CPC .............. *H01H 19/14* (2013.01); *G05G 1/12* (2013.01); *H02B 13/00* (2013.01); *G05G 5/28* (2013.01)

(58) Field of Classification Search
CPC .......... H01H 19/14; H01H 3/42; H01H 9/281; H01H 71/1018; H01H 71/56; H01H 19/11;
(Continued)

(56) References Cited

U.S. PATENT DOCUMENTS 5,634,357 A * 6/1997 Nutter ................... E05B 13/106
70/210
10,312,046 B1    6/2019 Clark et al.
(Continued)

FOREIGN PATENT DOCUMENTS

DE    4206378 A1    9/1993
EP    2811498 A1    12/2014

OTHER PUBLICATIONS

Extended European Search Report (EESR) dated Sep. 18, 2020 issued by the European Patent Office for related EPO Patent Application EP 20 37 2263, 7 pages, in English.

*Primary Examiner* — Ahmed M Saeed
(74) *Attorney, Agent, or Firm* — Hassan Abbas Shakir; Shakir Law PLLC

(57) ABSTRACT

The present invention refers to a detachable knob that can be easily and quickly detached and attached repeatedly from a switchgear. The detachable knob includes: a knob housing configured to be manually rotated about a rotation axis "X", and anchoring means placed inside the knob housing. A plunger is arranged inside the housing and is axially displaceable along the rotation axis "X", wherein the plunger is configured to bring the anchoring means from their engaged position to their disengaged position and vice versa. The plunger is axially displaceable relative to the anchoring means between two stable axial positions at axis "X", namely: a pushed-down position in which the plunger remains stable and force the anchoring means to their engaged or to their disengaged position, and a release position in which the plunger remains stable and in which the anchoring means are in the other position.

14 Claims, 18 Drawing Sheets

(51) Int. Cl.
   *H02B 13/00* (2006.01)
   *G05G 5/28* (2006.01)

(58) Field of Classification Search
   CPC ...... H01H 19/585; H01H 19/58; H01H 19/62; H01H 19/635; H01H 19/64; H01H 19/63; H01H 19/005; H01H 19/10; H01H 1/2041; H01H 19/56; H01H 19/03; H01H 19/02; H01H 2019/006; H01H 19/00; H01H 19/20; H01H 19/001; H01H 21/50; H01H 2221/01; G05G 1/12; G05G 5/28; H02B 13/00
   See application file for complete search history.

(56) References Cited

U.S. PATENT DOCUMENTS

| | | |
|---|---|---|
| 2017/0242453 A1 | 8/2017 | Sinthomez et al. |
| 2017/0372856 A1* | 12/2017 | Singh ........................ H01H 9/22 |
| 2019/0206636 A1 | 7/2019 | Kuhn |

* cited by examiner

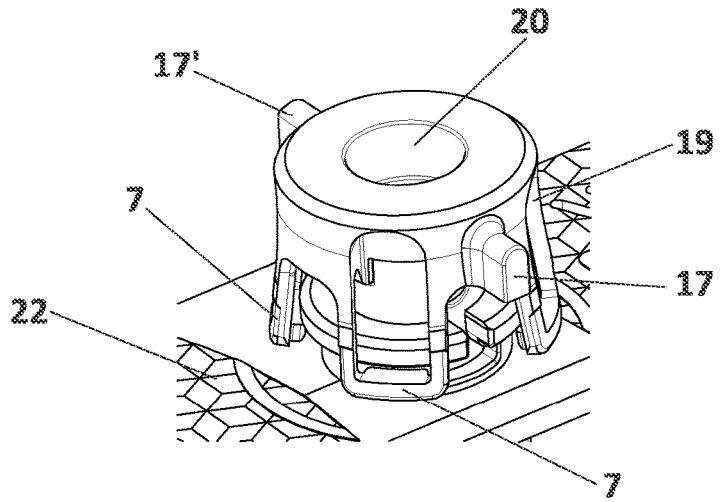
FIG. 7A
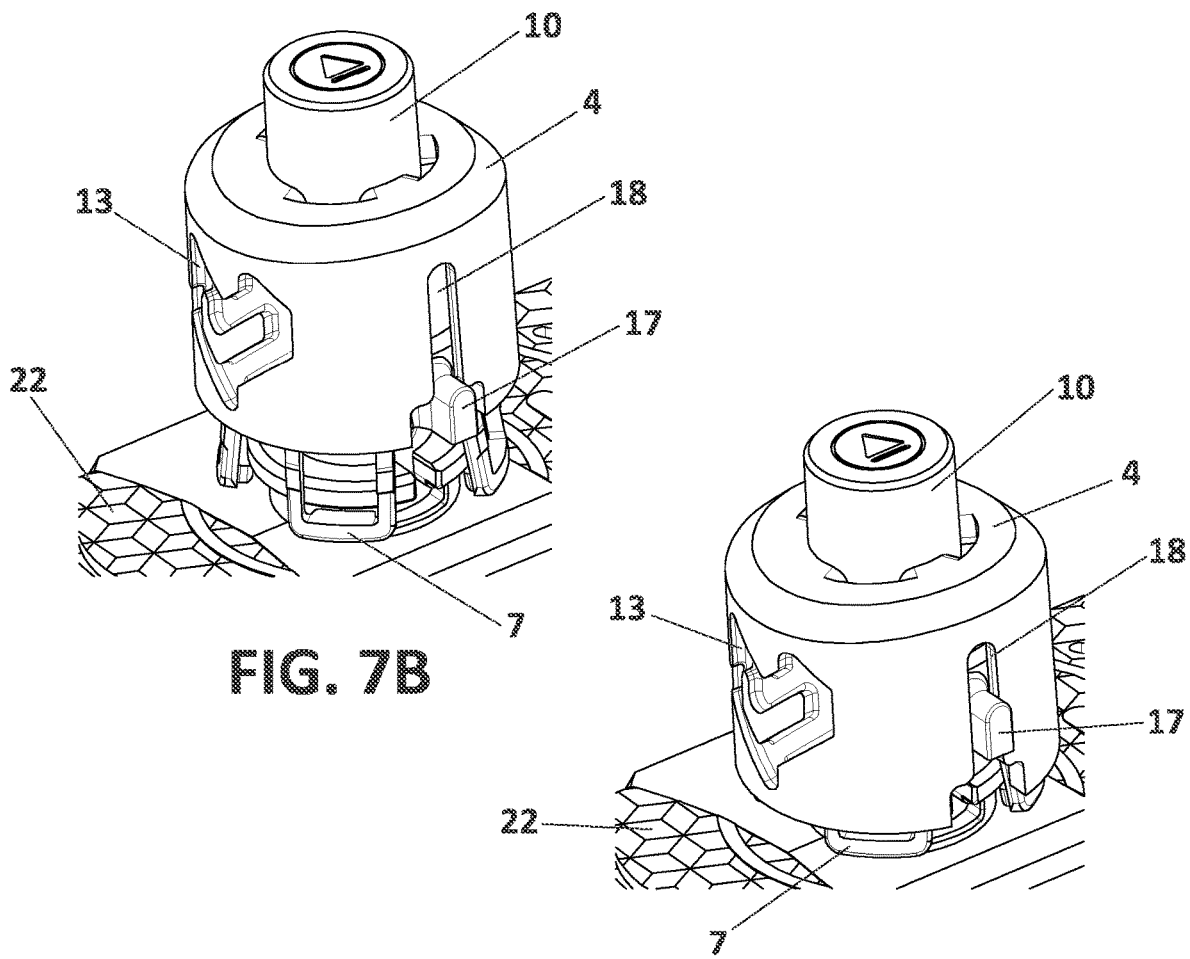
FIG. 7B
FIG. 7C

DETACHABLE KNOB FOR ACTUATING SWITCHGEAR, AND A SWITCHGEAR DEVICE INCORPORATING THE DETACHABLE KNOB

FIELD OF THE INVENTION

The present invention refers in general to knobs or handles for manually actuating switchgear like: fused switches, circuit breakers, changeover switches, actuating mechanism for switches, and switching devices in general.

BACKGROUND OF THE INVENTION

Typically, circuit breakers are installed within a distribution board closet, and the handle for switching on and off the circuit breaker body, is assembled outside the closet with the door of the closet, such that a long transmission rod is mechanically connected the handle with the circuit breaker.

Normally, distribution boards are a multi-pole installations that includes several breaking poles, for example assembled as an array of circuit breakers and mounted on a common shaft that operate all the circuit breakers simultaneously. These multi-pole switching assemblies, generally comprises a mechanism for operating the cut-off poles which is coupled to a common shaft arranged to pass through the cut-off poles, this cut-off shaft being coupled to the various movable contacts of these poles.

This actuator mechanism is manually operated by a handle or knob coupled to a transmission rod, such that by rotating the handle by actuation of the control device, this kinematic chain makes it possible to move all movable contacts of the cut-off poles from their closed position to their cut-off position (and vice versa) and thus to control an abrupt engagement or tripping. of the switching device.

Examples of handles for switchgear are disclosed for example in patent publications: U.S. Pat. No. 10,312,046 B1 and U.S. Patent Application Publication 2017/0242453 A1.

For maintenance or repair operations, current circulation through the installation is cut-off by switching-off main switches at the main switchboards of the installation, so that, operators can securely access any conducting component of the installation. However, there is a risk that the main switches are switched-on again by someone unaware that maintenance or repair works are going on downstream the installation, in which case fatal accidents might occur.

Therefore, it is essential to avoid that the main switches are inadvertently switched back on again, thus powering up an electrical installation on which an operator is currently working.

In certain cases, for the safety of users, the handle operating the switches can be removed to ensure that the switch remains in the open position. In other cases, the handle remains attached to the switch but it is locked in the open position, to impede undesired switching-on of the switch until maintenance works are completed and the switch is unlocked.

Topology of alternating current electrical systems with distributed neutral, vary depending on the function of the neutral line in the electrical system. In these distributed systems, the purpose of the neutral line is two-folded, first the neutral line or pole is used for the return current of the circuit, and secondly as a safety measure in electrical installations to protect users from accidental electrical discharges.

Distributed low voltage neutral is mainly used to provide a single-phase voltage to supply circuits, such as lighting or control auxiliaries, in addition to the three-phase voltage. A three-phase line with distributed neutral of 400V and a single-phase voltage between line and neutral of 230V, is very common.

The neutral conductor is used to supply single-phase loads, thus, cutting off (opening) the neutral pole upstream must be carried out after switching off the main poles or phase lines, or at least simultaneously with that of the switching-off of the main poles or lines. In this way, it is assured that the neutral pole is always connected when the main poles are connected or about to be connected.

If the neutral is accidentally switched off while the main poles or lines of the phases are switched on, the neutral pole can no longer serve as its mains purpose that is to allow the current to return to the source, and a 230 V supply of the single-phase loads. This accidental switching-off of the neutral might have catastrophic consequences on the receivers or loads. In that case, the return current, instead of returning through the neutral line, might return through the rest of the receiver impedances connected to the rest of the phase lines of the three-phase system, causing network imbalances and over voltages in the receivers and causing damages.

In addition, it is necessary to establish safety measures in electrical installations that prevent and protect users from direct or indirect electrical discharges. The most widely used protection system is the earth or ground connection system.

There is the connection of the secondary neutral of the transformer of the low voltage system and on the other hand the masses of the installation.

Transformer secondary neutral can be connected to ground (directly or by impedance) or isolated from ground.

The earths of the installation, which are always connected to the earth of the building in which they are installed, either directly with the distributed earth cable or by means of the neutral conductor.

The functions of the neutral conductor and its treatment depend on the earth system of the installation The particular case of the TN systems the conductor of the neutral pole N of the secondary transformer is connected to earth and shared totally or partially with the earth conductor PE. TN-C Systems and TN-S Systems. In TN-C systems the case where the neutral and ground are totally shared. This single conductor is called PEN and has the dual function of: A) of neutral where it is used as a current return for single-phase loads and also B) as a protective earth conductor.

In this type of TN-C system the shared PEN conductor for Neutral and Ground Protection System should never be interrupted as the ground protection function prevails.

Therefore, the neutral function is limited to the neutral being fixed. However, it may be necessary that this common conductor for neutral and ground has to be disconnected consciously and temporarily for testing and maintenance tasks of the ground protection systems.

It is imperative that this PEN conductor must be disconnected making sure that there is no voltage on the lines, and then connected again before the connection of the main voltage lines.

At present, the PEN conductor is associated, either globally or in sections, with a plate-type contact that is manually unscrewed and screwed independently of the general switch or the associated section switch that is operated to electrically isolate the section for checking purposes.

In order to avoid errors in the operation sequence it is necessary to establish working methods that try to minimize the risk of forgetfulness, since if the operational sequence is not followed there may be a high risk of over-voltages in the equipment due to the absence of the neutral function and the most serious failure to comply with the earth protection function that must prevail as it is a safety system for people.

In TN systems, fuses and circuit breakers are usually used as protection devices to isolate them from voltage for manipulation. Some equipment on the market integrate in a single product the fuse, switch, and module for fixed disconnectable neutral.

In this type of existing products in the market, it is possible that even following the procedures established for the manual disconnection of the neutral/earth, the circuit breaker can be actuated and the main contacts connect the circuit section or the equipment without having connected the neutral/earth line, and the priority function of earth protection is no longer fulfilled, creating a high risk for operators in the event of an electrical shock by indirect contact.

Therefore, there is the need for safe switching multi-pole modular devices, that avoid or at least minimizes the above-described hazards.

More specifically, an object of the invention is to provide a detachable knob that can be easily and quickly detached and attached repeatedly from a switchgear.

An additional object of the invention is to provide a knob of the above type that can be manufactured in a cost-effective manner, without using screws or other similar ancillary components Still, another object of the invention is to provide a switchgear device integrating security features that prevent accidental or undesired operations of the associated switching devices, specially to the switching on state, as to guarantee safety of operators. This object involves the use of the above-mentioned detachable knob with a switchgear device.

SUMMARY OF THE INVENTION

The present invention is defined in the attached independent claim, and satisfactorily solves the drawbacks of the prior art, by providing quick-release detachable knob for actuating a switchgear. In the present disclosure the term switchgear should be understood to encompass: actuators for switches, fused switches, circuit breakers, changeover switches, and switching devices in general.

The detachable knob of the invention comprises a knob housing configured to be manually grabbed and rotated about a rotation axis "X", and anchoring means placed inside the knob housing and configured to transit from an engaged position to a disengaged position and vice versa. In the engaged position, the anchoring means are capable of attaching the knob, the knob housing in particular, with a part of a switchgear, such that the knob can be operatively attached to the switchgear to operate the same. In the disengaged position the anchoring means detach the knob (the knob housing) from that part of a switchgear, and the knob can be detached from the switchgear.

The detachable knob further comprises a plunger arranged inside the housing and axially displaceable along the rotation axis "X". The plunger is configured to actuate on the anchoring means, to bring the anchoring means from their engaged position to their disengaged position and vice versa.

The plunger is axially displaceable relative to the anchoring means between two stable (permanent) axial positions at axis "X", namely: a pushed-down position in which the plunger remains stable and force the anchoring means to their engaged or to their disengaged position, and a release position in which the anchoring means remains stable and bring the anchoring means to their other position.

The detachable knob additionally includes biasing means arranged inside the knob housing to axially bias the plunger away from the anchoring means.

The knob housing is open at the bottom and has an opening at a top part thereof, through which the plunger is accessible to allow an user to manually push-down the plunger along axis "X", in a way that by pushing down the plunger, it transits reversely between its two stable positions. Therefore, the knob operates as a bi-stable mechanism, which in one of its stable configurations it can engage a part of a switchgear, and in the other stable configuration, it disengages from the switch gear.

The bi-stable operation of the knob, is carried out by retention means formed with the plunger and the knob housing.

The anchoring means might be formed in the knob housing or in the plunger, such that the knob housing and the plunger cooperates to engage or disengage the anchoring means. In a preferred embodiment, the knob includes a crown member that is co-axially assembled with the plunger along the rotation axis "X" and inside the knob housing, and the anchoring means are integrally formed in the crown member.

The plunger is arranged closer to a top area of the knob housing, and the crown member is closer to a bottom open base of the knob housing. The crown is attached to the knob housing such that the crown and the knob housing are jointly rotatable, that is, they do not move axially or rotate relative to each other.

The anchoring means are embodied as two or more flexible claws (preferably four claws, distributed in two pairs of claws facing each other) integrally formed with the crown, and axially projecting from the crown main body. The claws are configured to flex in a direction intersecting with the axis "X", such that, the anchoring means are in their engaged position when the claws are flexed due to the contact with the plunger, and in the disengaged position when the claws are not in contact with the plunger, so the claws are in their rest or relaxed position.

The knob housing has a cylindrical chamber extending along the rotation axis "X", and the plunger is a cylindrical tubular body and it is received within that cylindrical chamber. The plunger has an open bottom base, such that in the pushed-down position, the crown is received inside the plunger in a way that the plunger forces the claws to flex towards their engaged position. In the released position of the plunger, the claws are in their rest position.

The external surface of the plunger and the internal surface of cylindrical chamber are facing each other, and the knob housing has at least one groove (first groove) formed on the internal surface of the cylindrical chamber, and the plunger has at least one groove (second groove) formed on its external surface. The knob further comprising a ball (a bearing ball) received within both grooves, such that the ball can roll along the first and second grooves as the plunger moves up and down the axis "X".

The first groove at the knob housing lies on a plane orthogonal to the axis "X", so this groove is an arc of a circumference or a whole circumference, thereby, the ball can only move horizontally inside the groove of the knob on an a plane orthogonal de the axis "X".

The second groove has the form of a closed loop, having a first valley and a second valley placed above the first valley, and an ascending path and a descending path, both paths communicating the first and second valleys. First and second valleys are vertically aligned along an axis parallel to rotation axis "X". Each valley is configured to retain the ball inside the valley, so the first valley retains the plunger in a first axial permanent position against the force exerted by the biasing means, and the second valley retains the plunger in a second axial permanent position against the force exerted by the biasing means.

When the plunger is pressed-down, the ball moves from the first valley to the second valley by rolling along the ascending path of the groove of the plunger and horizontally within the groove of the knob housing, and when the plunger is pressed-down again the ball moves back from the second valley to the first valley by rolling along the descending path and horizontally within the groove of the knob housing.

Preferably, the biasing means is a compression spring, co-axially arranged about axis "X", between the plunger and the anchoring means, such that the displacement of the plunger towards its engaged position is against the force exerted by the biasing means, and the displacement of the plunger towards its disengaged position is assisted by the force of the biasing means.

The knob housing has a lateral level projecting in an orthogonal direction with respect to axis "X", having an internal cavity providing access to the plunger. The knob further comprises a displaceable latch received within the cavity, and displaceable inside the cavity between a locked position and an unlocked position. The latch is configured to lock the plunger in its locked position, as to impede the plunger displacement. Second biasing means are assembled biasing the latch away from the plunger.

Another aspect of the invention refers to a switchgear module comprising a housing having an aperture providing access to the housing interior, and a cover or lid removably mounted with the housing closing the aperture.

The module further comprises a disconnectable switch member enclosed inside the housing, and a switch actuation mechanism also enclosed, at least in part, inside the housing.

A detachable knob, preferably the detachable knob previously described, is detachably coupled with the module. The detachable knob is arranged above the cover and it is mechanically connected with the switch actuation mechanism through the cover, in a way that the knob impedes removal of the cover when the knob is coupled with the module, thus, the cover can be removed and the housing interior accessed, only when the detachable knob is detached from the module. Therefore, for disconnecting the switch member can only be disconnected, after detaching the knob and removing the cover, and since the knob is not coupled with the actuation mechanism, this cannot be operated, thereby implementing a security feature for the module.

When the detachable knob is coupled with an actuation mechanism, the knob is reversely rotatable between a switched-on position (in which the switches operated by the knob are switched-on), and a switched-off position in which the switches are off. The detachable knob is configured to be detachable in its switched-off position, and to unable detachment in its switched-on position.

Preferably, the disconnectable switch member is a metal plate, for example screwed to an internal support within the housing.

The cover has an opening and a neck extending around the neck, and wherein the anchoring means are configured to engage with the neck in their engaged position, and wherein the detachable knob is coupled with the switch mechanism through that opening.

The module has a rotatable shaft received with the opening, wherein the shaft is coupled with the switch mechanism, and wherein the crown is configured to coupled and uncouple with the shaft.

With the above described structure, the switch array of the invention accomplishes the following advantages and features:

Quick coupling-decoupling system in a given position. A user, without the use of tools, simply by pressing a bi-stable button, is capable to couple or uncouple the knob only in a predefined position.

The knob can be locked by a padlock in the OFF position. When the padlock is on, the decoupling system is disabled. When the knob is out of the OFF position, the latch is disabled.

Safety: by removing the knob, accidental operation of a switch gear during maintenance, by unauthorized personnel or in other situations, are prevented.

Facilitates maintenance: by removing the knob, adjacent areas previously occupied by the knob, are now accessible (for example, removing the knob allows access to the fuse area for replacement or maintenance, which could not be done previously).

Compact design: by removing the knob, it allows more compact designs since it is not necessary to design the knob considering the switchgear surroundings.

Savings in maintenance costs: thanks to the quick coupling-uncoupling system, it is not necessary to use tools to place and remove the knob. It is enough to press a button manually to allow coupling and uncoupling, which saves assembly and disassembly time.

Knob operable in any position distributed up to 290° without restrictions.

BRIEF DESCRIPTION OF THE DRAWINGS

Preferred embodiments of the invention are henceforth described with reference to the accompanying drawings, wherein:

FIG. 7A is a first perspective view illustrating more in detail the coupling between the plunger and the cover by means of the crown member wherein the plunger presses the claws as it is pressed-down towards the cover.

FIG. 7B is a second perspective view illustrating more in detail the coupling between the plunger and the cover by means of the crown member wherein the plunger presses the claws as it is pressed-down towards the cover.

FIG. 7C is a third perspective view illustrating more in detail the coupling between the plunger and the cover by means of the crown member wherein the plunger presses the claws as it is pressed-down towards the cover.

FIG. 9.—shows several perspective views illustrating how the latch blocks the housing with the cover.

FIG. 14.—shows a sequence of coupling positions between the knob and a cover, wherein

PREFERRED EMBODIMENT OF THE INVENTION

Figure 1:
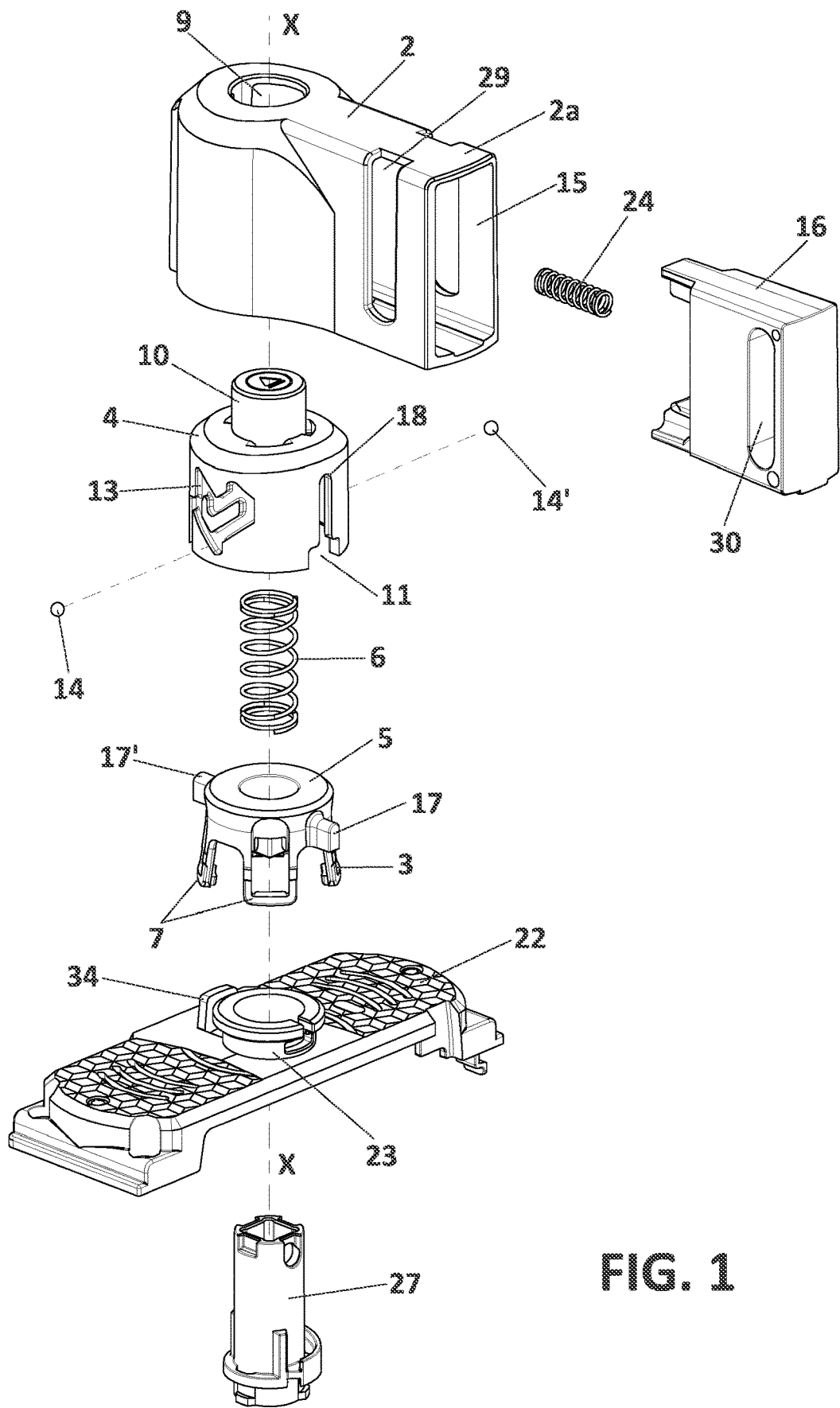
FIG. 1.—shows an exploded view of a detachable knob according to the invention.

FIG. 1 shows a preferred implementation of the detachable knob (1) of the invention, that comprises a knob housing (2) configured to be manually rotated about a rotation axis "X", and anchoring means (3) placed inside the knob housing (2) and configured to transit between an engaged position and a disengaged position and vice versa.

A plunger (4) is arranged inside the knob housing (2) and it is axially displaceable along the rotation axis "X". The plunger (4) is configured to bring the anchoring means (3) from their engaged position to their disengaged position and vice versa, as it will be described in detail later-on.

The detachable knob (1) comprises a crown (5) co-axially mounted with the plunger (4) along the rotation axis "X" and placed inside the knob housing (2). The crown (5) is attached to the knob housing (2) in a way that the crown (5) and the knob housing (2) are jointly rotatable. For that, the crown (5) has two lateral arms (17,17') extending orthogonally to the axis "X", that are received inside axially extending grooves (18,18') formed in the plunger (4).

Additionally, the anchoring means (3) are two or more flexible claws (7) integrally formed with the crown (5), so that the claws (7) can flex in a direction that intersect the axis "X".

The detachable knob (1) comprises a biasing means, that in this implementation consist of a compression spring (6), co-axially arranged about axis "X", and placed inside the knob housing (2) to axially bias the plunger (4) away from the crown (5).

Figure 2A:
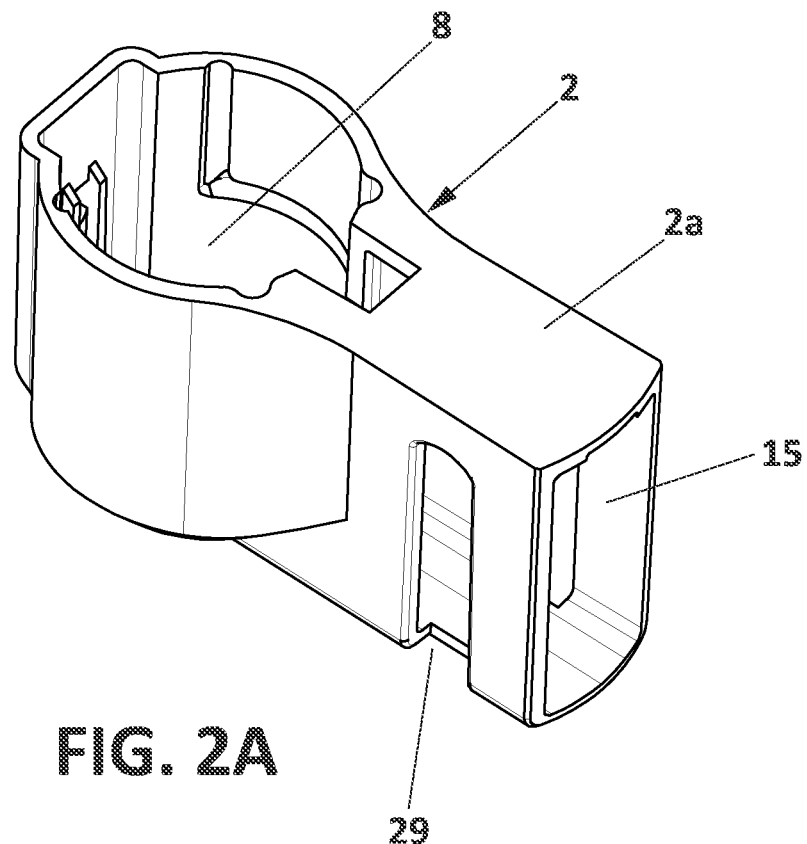
FIG. 2.—shows two perspective views of the knob housing, from below (FIG. 2A) and from above (FIG. 2B).
Figure 2B:
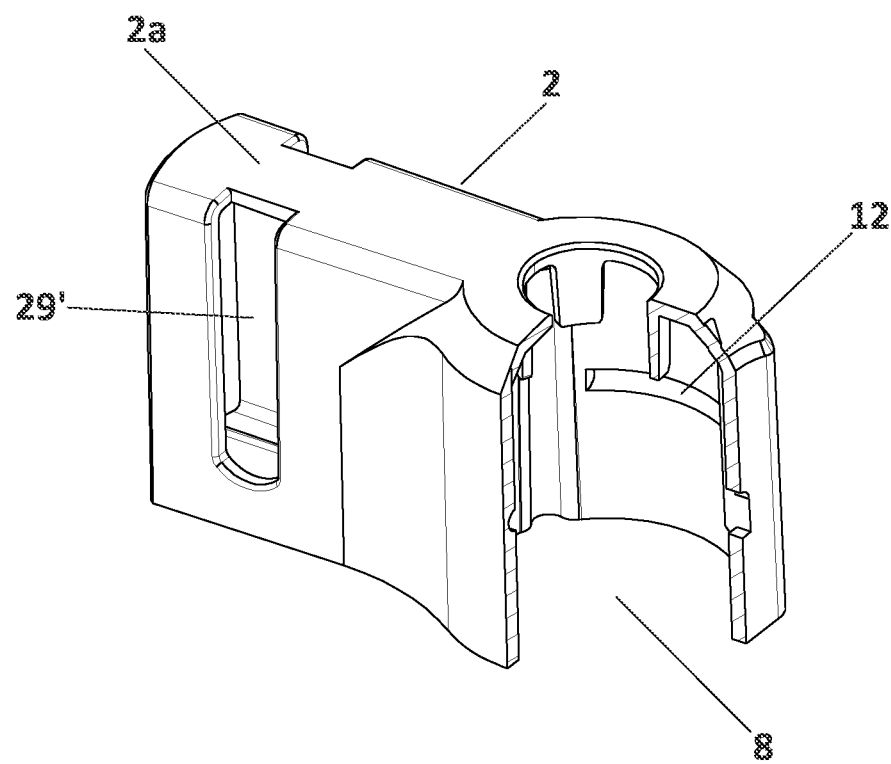
Figure 3A:
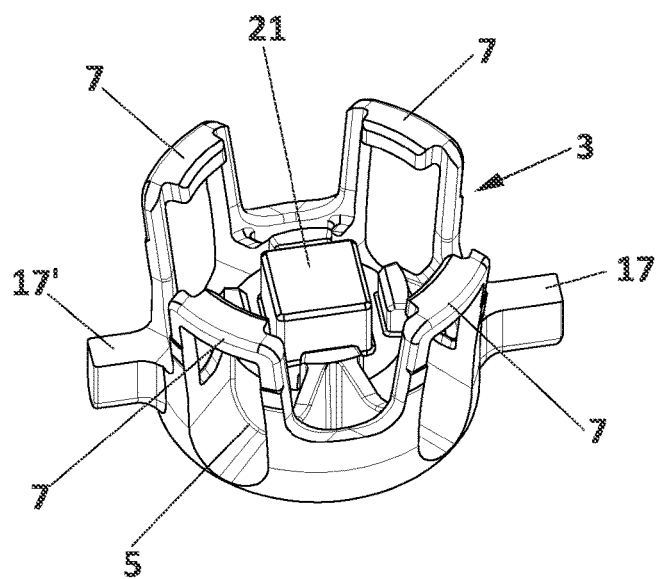
FIG. 3.—shows several perspective views of the crown member in FIGS. 3A, 3B and 3D.
FIG. 3C is a bottom plan view.
Figure 3B:
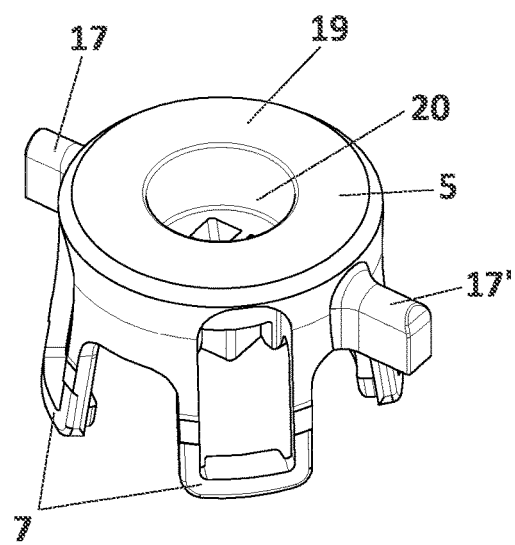
Figure 3C:
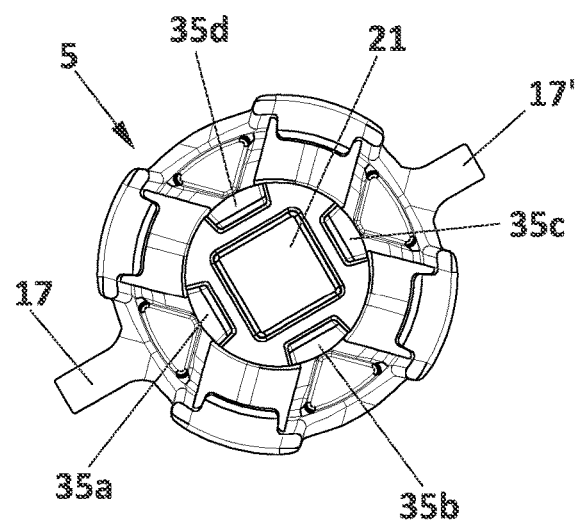
Figure 3D:
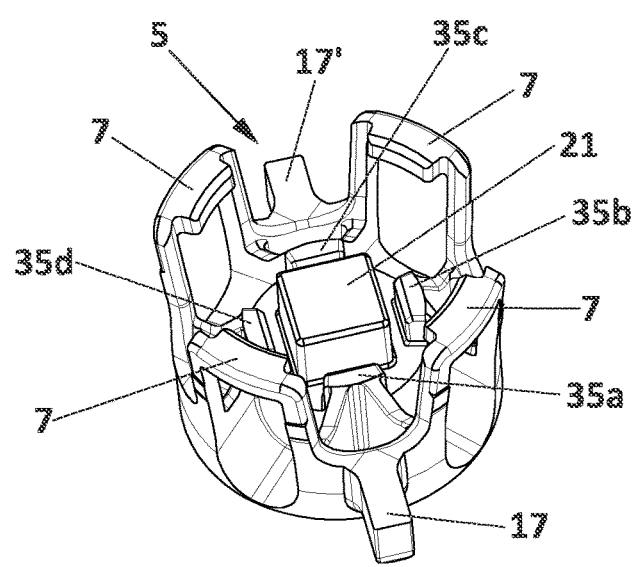

The knob housing (2) has a cylindrical chamber (8) formed around the rotation axis "X", and the plunger (4) has a cylindrical configuration and it is received inside that cylindrical chamber (8). The knob housing (2) has an open bottom base (see FIG. 2A), and an opening (9) at a top part thereof, in a way that the plunger (4) is accessible through that opening (9), whereas the anchoring means (3) are accessible through the open bottom base (8).

Figure 5A:
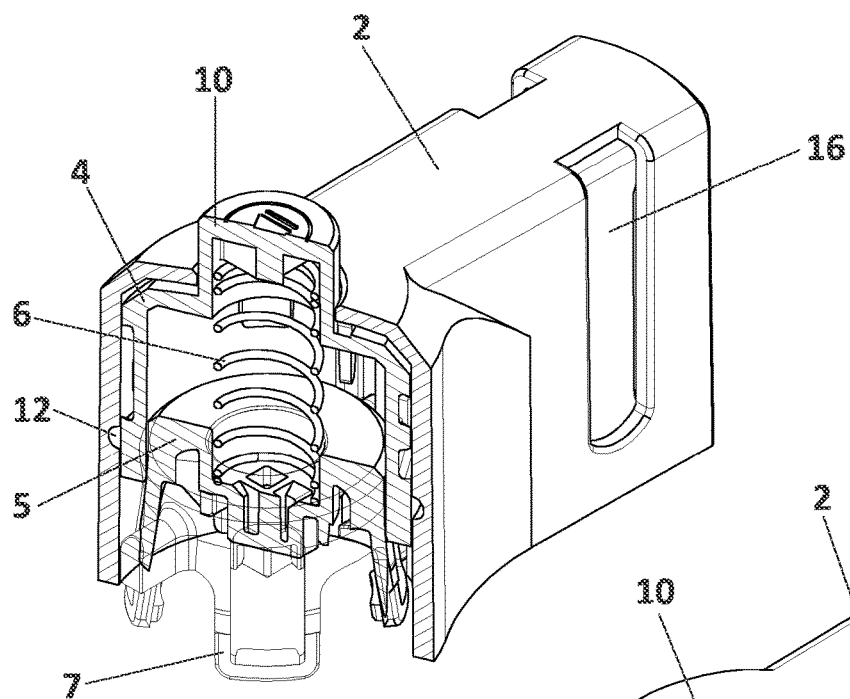
FIG. 5A is a perspective view and partially sectioned of the assembly formed by the knob housing, the plunger and the crown member wherein the plunger does not press the claws of the crown, thus, the claws are expanded.
Figure 5B:
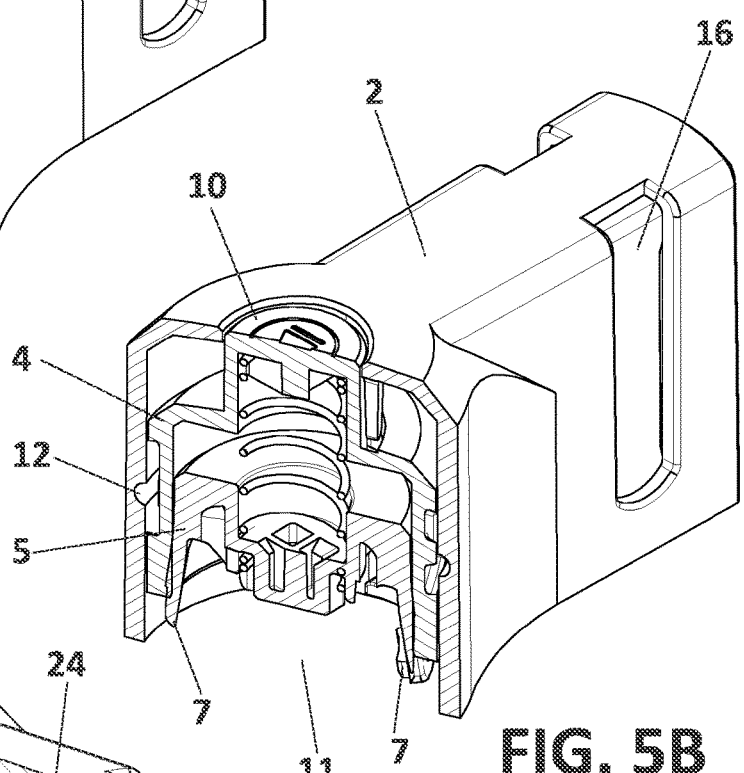
FIG. 5B is a perspective view and partially sectioned of the assembly formed by the knob housing, the plunger and the crown member wherein the plunger presses the claws such that the claws are flexed towards the crown interior.

The plunger (4) has a cylindrical neck (10) at a top part thereof, which is received inside the top opening (9) as shown for example in FIGS. 5A, 5B, in a way that the cylindrical neck (10) serves as a push-bottom to actuate the knob (1).

The plunger (4) it is placed above the crown (5), and it is axially displaceable relative to the crown (5) and relative to the anchoring means (3) between two stable axial positions at axis "X", namely: a pushed-down position (FIGS. 5B, 5C) in which the plunger (4) remains stable and forces the anchoring means (3) to their engaged position, and a release position (FIG. 5A) in which the plunger (4) remains stable and in which the anchoring means (3) are in their disengaged position. Since the plunger (4) is accessible from outside the knob housing (2), the plunger (4) can be pushed-down along axis "X", such that by pushing down the plunger (4), it transits reversely between its two stable positions.

Additionally, the plunger (4) has an open bottom base (11), and the plunger (4) and the crown (5) are configured such that in the pushed-down position of the plunger (FIG. 5B), the crown (5) is received inside the plunger (4), and the plunger (4) forces the claws (7) to flex towards their engaged position. In the engaged position, the anchoring means (3), that is, the claws (7) engage with a neck (23) of a cover (22) of a switch gear as it will be explained later-on.

The external surface of the plunger (4) and the internal surface of cylindrical chamber (8) are facing each other, and the knob housing (2) has at least one first groove (12) provided on the internal surface of the cylindrical chamber (8). The plunger (4) has at least one second groove (13) provided on its external surface, and a ball (14) is received within the first and second grooves (12,13), such that the ball (14) can roll along the first and second grooves (12,13) upon displacement of the plunger (4). Preferably, there is a pair of first grooves (12,121 and a pair of second grooves (13,13') at diametrically arranged positions, and two balls (14,14') respectively for each couple of complementary grooves (12,13) and (12",13").

Each of the first grooves (12,12') has the form of arch of circumference and lies on a plane orthogonal to the axis "X", such that axial displacement of the balls (14,14') is prevented.

The knob housing (2) has a lateral level (2a) that projects in an orthogonal direction with respect to axis "X". The lateral level (2a) has an internal cavity (15) providing access to the chamber (8) and to the plunger (4). Additionally, the knob (1) further comprises a displaceable latch (16) received within the cavity (15), such that the latch (16) is displaceable between a locked position in which it impedes plunger (4) displacement, and an unlocked position in which plunger (4) displacement is allowed. A compression spring (24) is placed between the knob housing (2a) and the latch (16), biasing the latch (16) away from the knob housing.

FIGS. 3 A-3C, shows the crown (5) in more detail. The crown (5) has a cylindrical base (19), two lateral arms (18,18') projecting diametrically from the base (19), and four flexible claws (7) extending from the base (19), wherein each claw (7) has a U-shaped configuration, and are adapted to flex towards the axis of the base (19). The base (19) has a cylindrical opening (20) at its top base to receive the spring (6), and a squared protrusion (21) placed internally right below the opening (20).

Figure 4A:
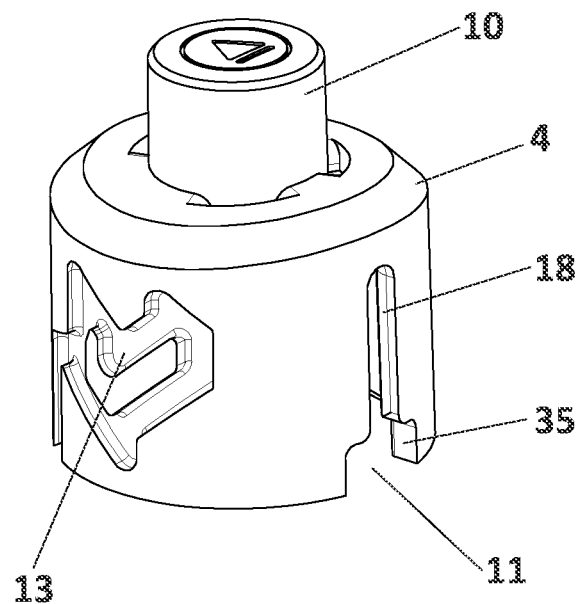
FIG. 4A is a perspective view of the plunger in one angular position.
Figure 4B:
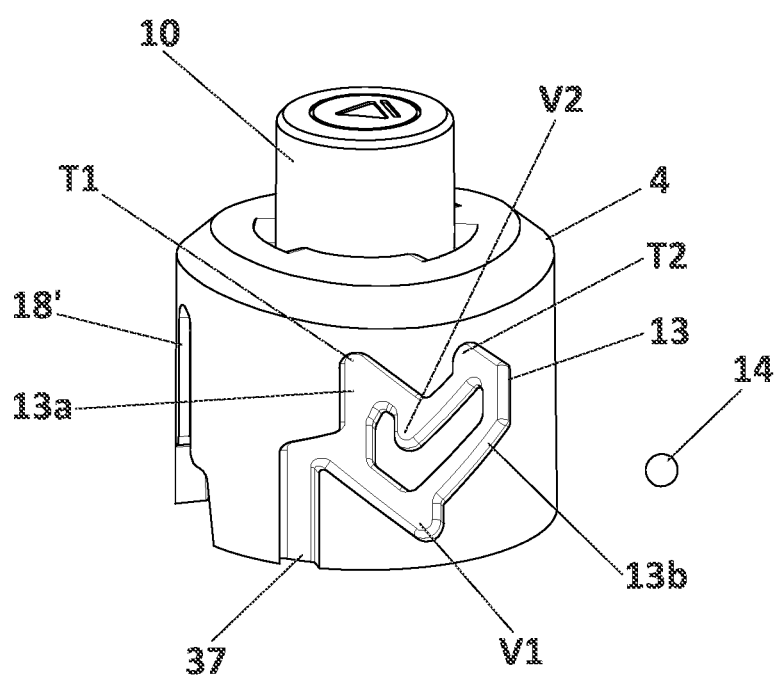
FIG. 4B is a perspective view of the plunger in another angular position.

FIGS. 4 A-4C, shows the plunger (4) in more detail, and specially the configuration of the grooves (13,13').

Figure 5C:
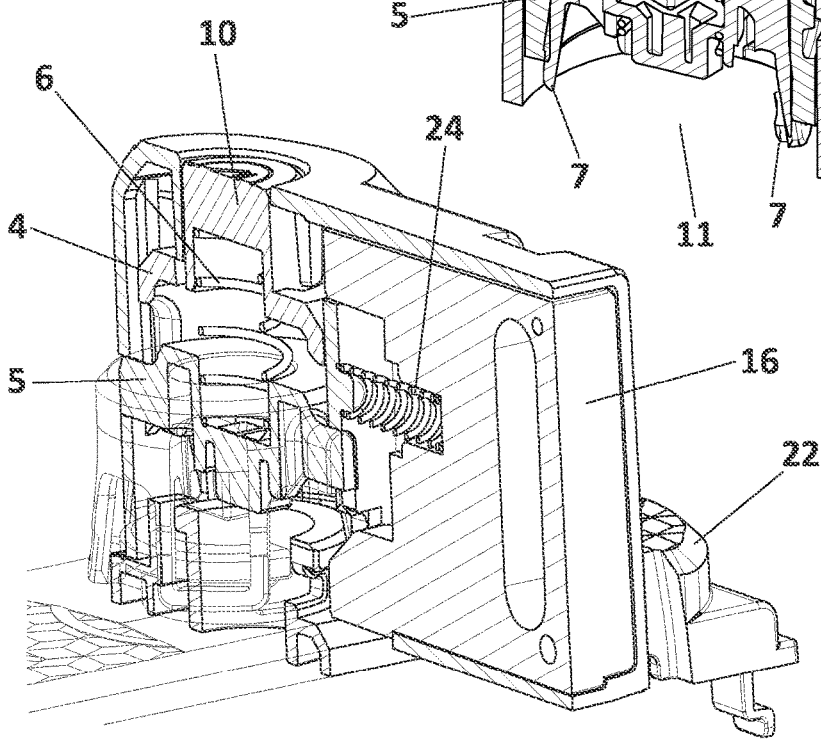
FIG. 5C is a perspective view and partially sectioned of the assembly formed by the knob housing, the plunger and the crown member wherein the plunger is in its engaged position in which the plunger remains stable in its lowermost position, and in which the claws are flexed towards the crown axis, so that the detachable knob can be attached to a part of a switch gear.

The complete assembly is represented in FIGS. 5A-5C, in particular the two stable axial positions of the plunger (4). In FIG. 5A the plunger (4) is in its released position in which the plunger (4) remains stable in its upper axial position, and in which the claws (7) are disengaged, so that the detachable knob (1) can be detached from a switch gear. It can be noted in FIG. 5A, that in this position the plunger (4) does not press the claws (7) of the crown, thus, the claws (7) are expanded.

In FIGS. 5B, 5C the plunger (4) is in its engaged position in which the plunger (4) remains stable in its lower-most position, and in which the claws (7) are flexed towards the crown (5) axis, so that the detachable knob (1) can be attached to a part of a switch gear. It can be noted in FIG. 5B, that in this position the plunger (4) presses the claws (7), such that the claws are flexed towards the crown (5) interior.

Figure 6A:
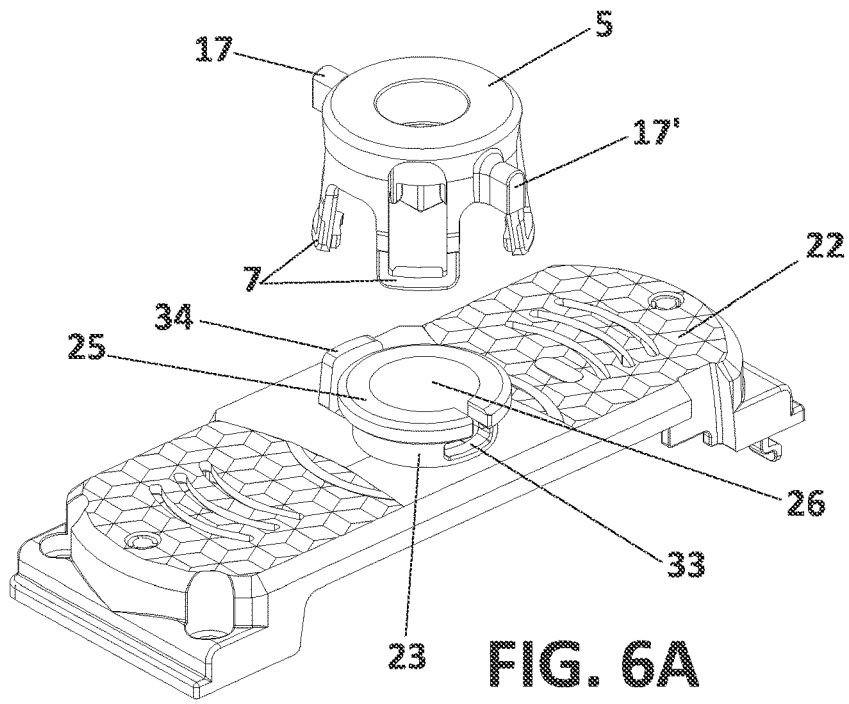
FIG. 6A is a first perspective view illustrating how the knob housing is coupled with the cover.

FIG. 6A shows more in detail how the crown (5) is coupled with the cover (22). The claws (7) are adapted to engage with neck (23) of the cover (22), and by means of a lib (25) that it formed around the edge of the neck (23). In the interior of the neck (23) there is an opening (26) passing through the cover (22). A shaft (27) is received inside the neck (23) co-axially with the axis "X", and it is coupled with the crown (5). For that coupling, the top end of the shaft (27) has a squared cavity (28) inside which the squared protrusion (21) of the crown (5) is coupled, so that, the rotation of the knob housing (2) is transmitted to the shaft (27) through the crown (5) when the detachable knob (1) is engaged with a switch-gear.

Figure 6B:
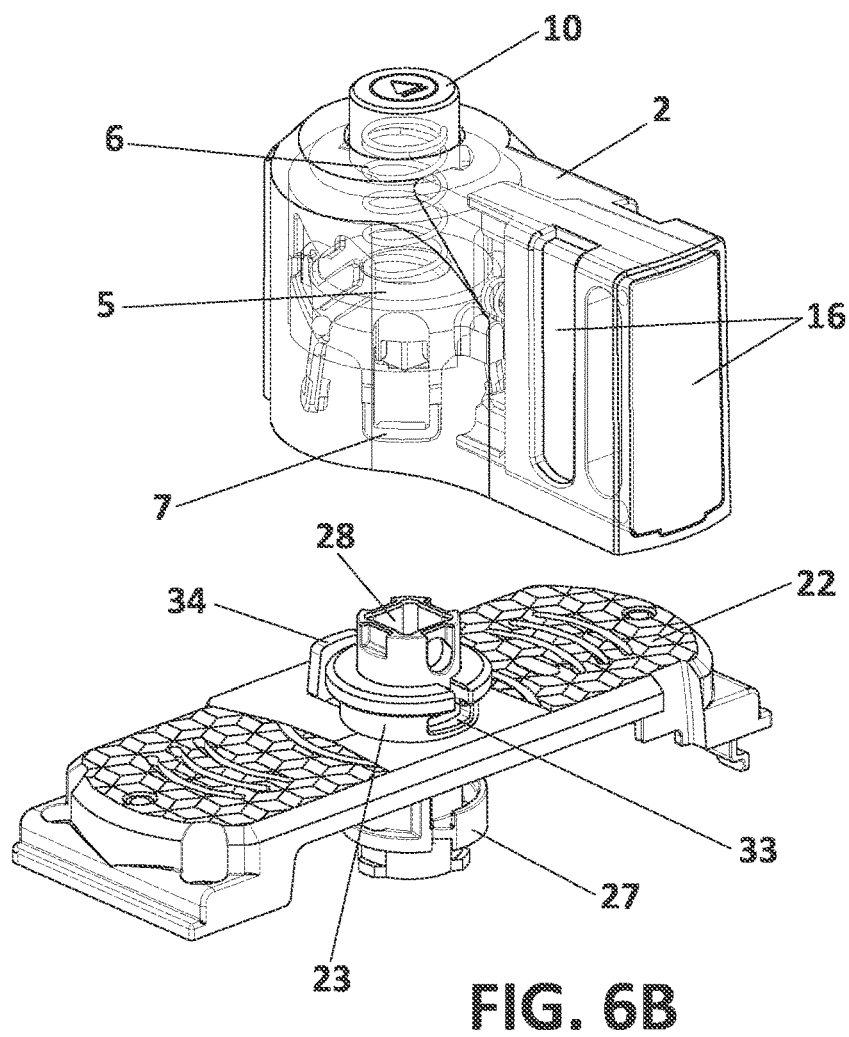
FIG. 6B is a second perspective view illustrating how the knob housing is coupled with the cover.
Figure 6C:
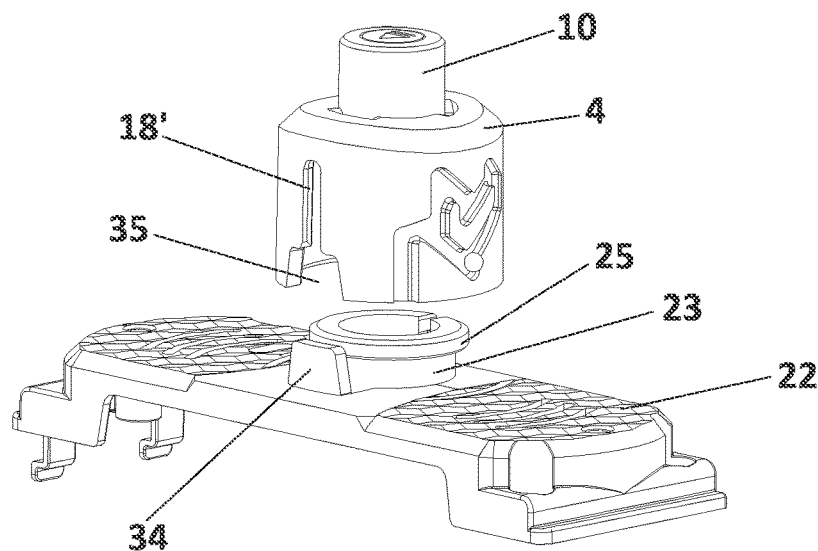
FIG. 6C is a third perspective view illustrating how the knob housing is coupled with the cover.
Figure 6D:
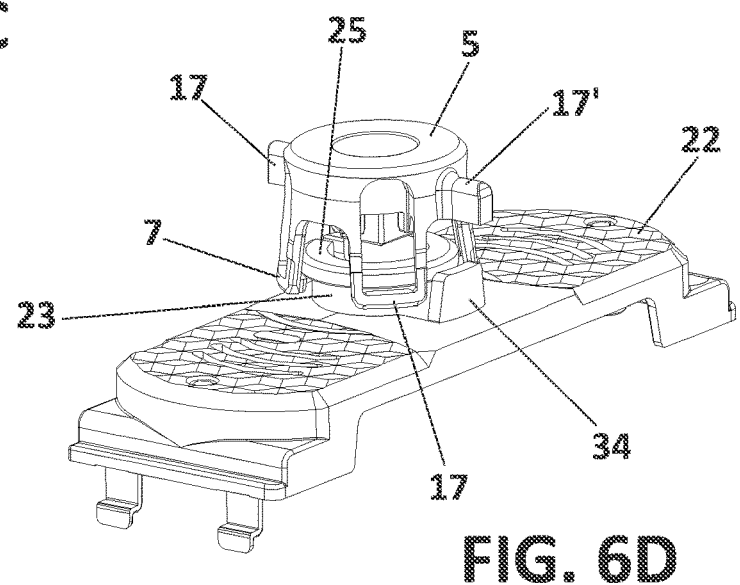
FIG. 6D is a fourth perspective view illustrating how the knob housing is coupled with the cover.
Figure 6E:
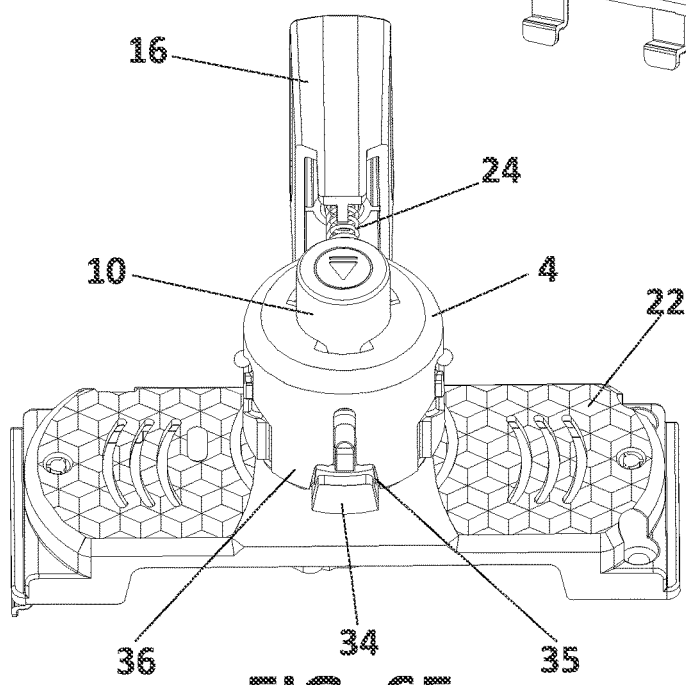
FIG. 6E is a fifth perspective view illustrating how the knob housing is coupled with the cover.

In FIG. 6C it shown that the cover (22) has a wall (34) near the neck (23), and that the plunger (4) has a notch (35) shaped complementary to the wall, in a way that the wall (34) can be received in the notch (36) as shown for example in FIG. 6E. With this configuration, the plunger (4) can be pushed-down only when the notch (35) and the wall (34) are aligned vertically as shown in FIG. 6E, otherwise, the wall (34) would contact with the bottom edge (36) of the plunger (4), and downwards displacement of the plunger (4) is blocked by the wall (34). With this configuration, the detachable knob (1) can only be actuated in a predefined angular position, for example when the knob (1) is in its Off position when it is attached to a switching device, so that in its On position, the knob (1) cannot be detached from the switching device.

As shown in FIGS. 6A, 6B, for coupling the detachable knob (1) to the cover, the knob (1) has to be oriented in the insertion position (in any other position it would not fit with the shaft (27) due to an existing "poka yoke" between crown (25) and the shaft (27), and then it slightly pressed against the neck (23) until the crown gets anchored to the lib (25) of the neck (23) by bending its four claws (7).

Figure 15A:
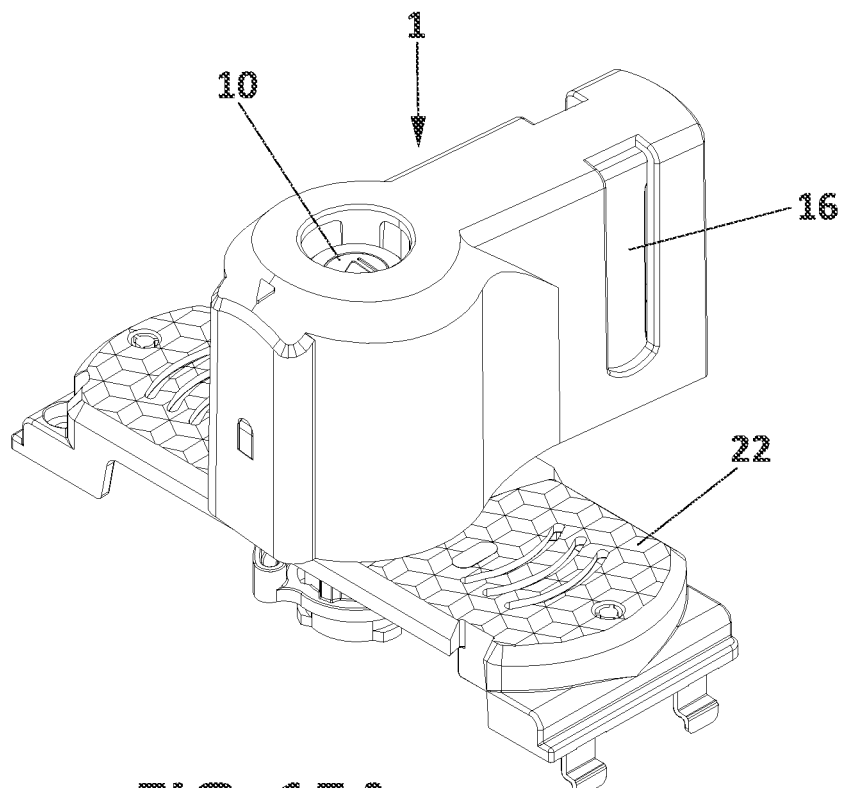
FIG. 15A is a first perspective view of a coupling position between the knob housing and the cover.
Figure 15B:
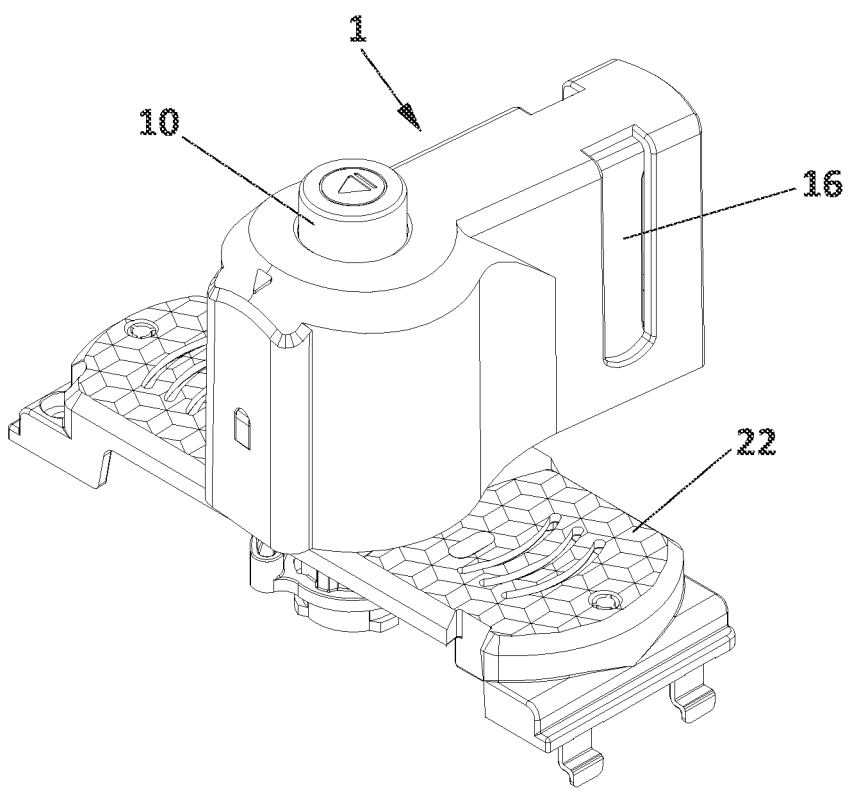
FIG. 15B is a second perspective view of a coupling position between the knob housing and the cover.
Figure 15C:
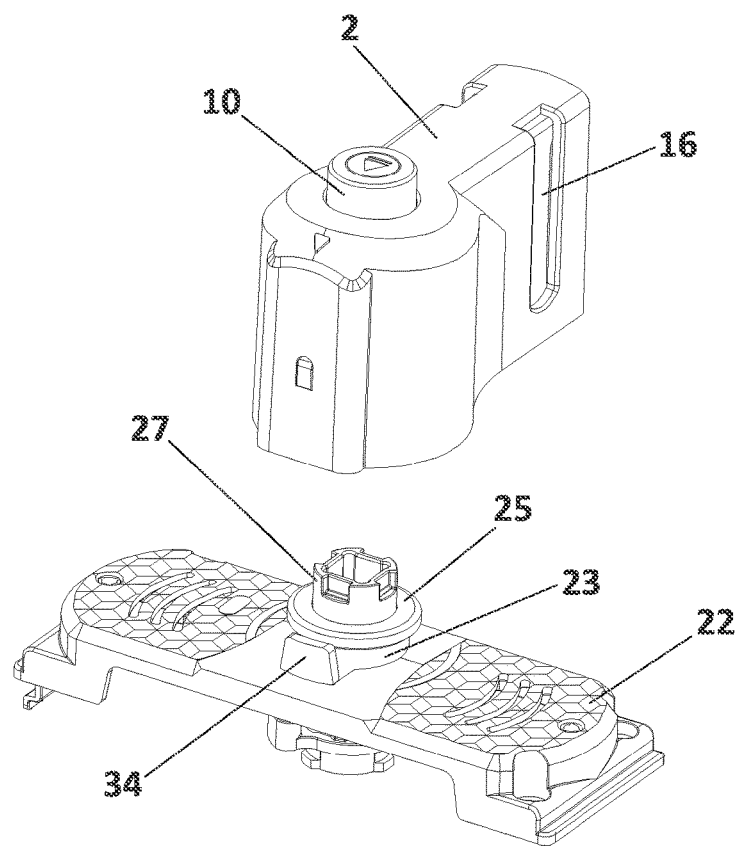
FIG. 15C is a third perspective view of a coupling position between the knob housing and the cover.
Figure 15D:
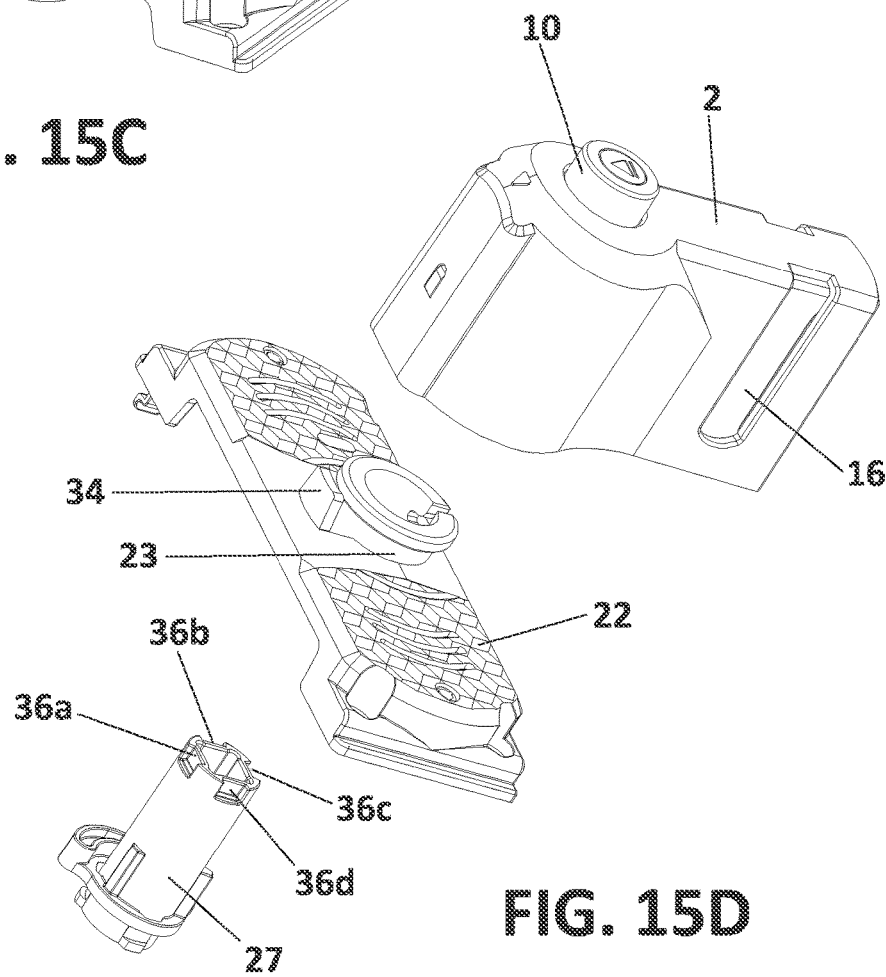
FIG. 15D is a fourth perspective view of a coupling position between the knob housing and the cover.

In order to save material costs and assembly time, the drive shaft (27) is coupled directly with the crown (5). For that, the crown (5) has internally, four battlements (35a,35b, 35c,35d) configured to be received inside four corresponding recesses (36a,36b,36c,26d) (FIG. 15D) formed at the upper part of the shaft (27) around squared cavity (28), so that, together they transmit the torque exerted by the user to the mechanism.

One of these battlements (35a,35b,35c,35d) has a different shape from the other 3, thereby embodying the "poka-yoke" or "key and lock" configuration mentioned before.

Once clipped, the assembly is secured by closing the claws by the action of the plunger (4) while it moves downwards pushed by a user, forcing the claws to close and engaging the neck (23). Only once the knob is engaged with the neck, the knob can it be turned, moving it to other positions.

In FIGS. 7A-7C shows clearly how the plunger (4) presses the claws (7) as it is pressed-down towards the cover (22).

FIGS. 8A-8C, 9A-9C illustrate the assembly of the knob housing (2) with the lateral latch (16) in different relative positions between the two components. The latch (16) is meant to lock the movement of the plunger (5), and as consequence of that, the rotation of the knob (1), for example when the knob (1) is attached to a switching device (not shown) in its open position, and some maintenance works has to be carried out in an electric installation.

The latch (16) is displaceable inside the internal cavity (15) of the lateral level (2a), between a locked position (FIG. 8B) in which it impedes plunger (4) displacement, and an unlocked position (FIG. 8A) in which plunger (4) displacement is allowed. The lateral level (2a) has to lateral windows (29,29"), and the latch (16) has a passing-through passage (30), which are arranged such that in the locked position (FIG. 8B), the lateral windows (29,29") and passage (30) overlap, and one or two padlocks (31) can be installed locking the latch (16) with the knob housing (2) (FIG. 10) to impede latch movement. In the unlocked position, the windows (29,29") are closed by the latch (16) as shown in FIG. 8A.

Figure 8A:
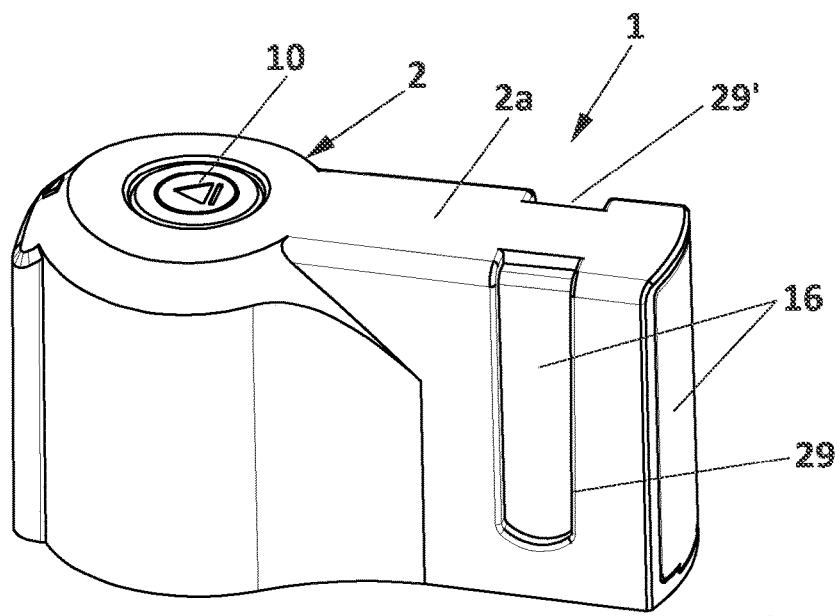
FIG. 8A is a first perspective view illustrating the assembly of the knob housing with the lateral latch in a different relative position between the two components.
Figure 8B:
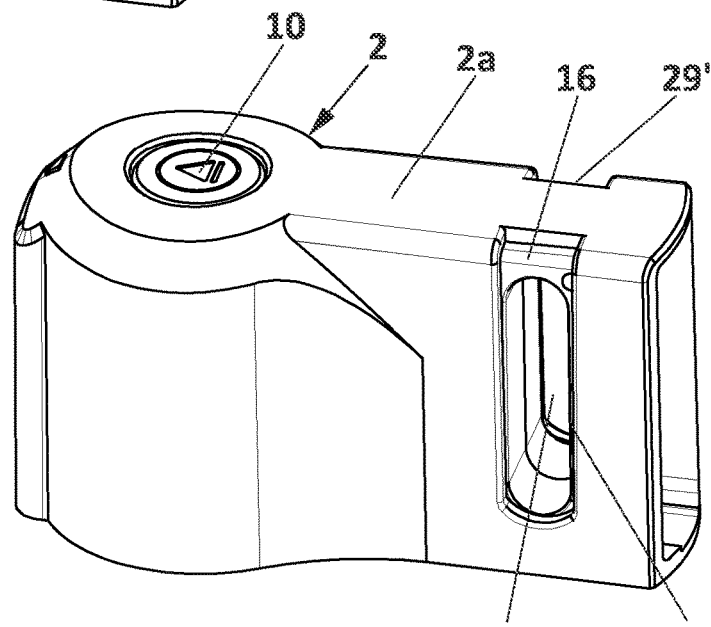
FIG. 8B is a second perspective view illustrating the assembly of the knob housing with the lateral latch in a different relative position between the two components.
Figure 8C:
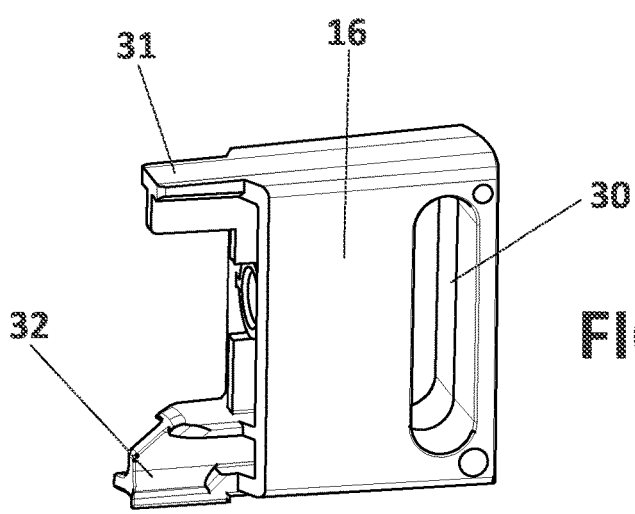
FIG. 8C is a third perspective view illustrating the assembly of the knob housing with the lateral latch in a different relative position between the two components.
Figure 9A:
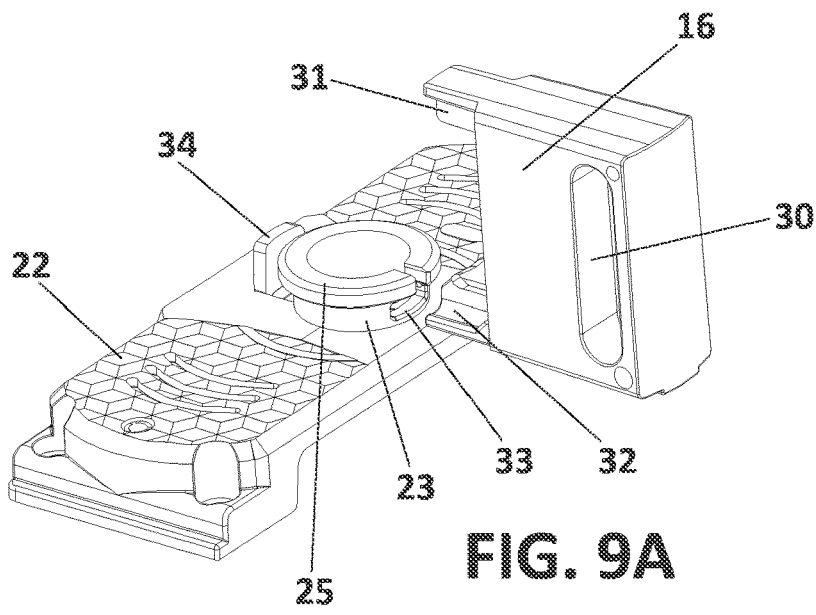
FIG. 9A is a perspective view.
Figure 9B:
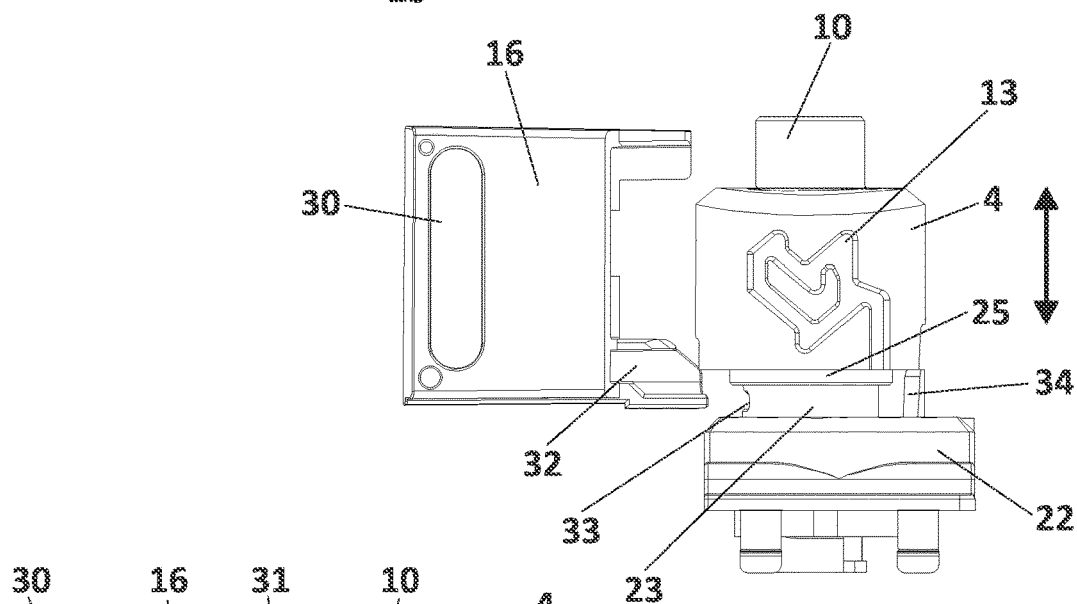
FIGS. 9B and 9C are elevational views.
Figure 9C:
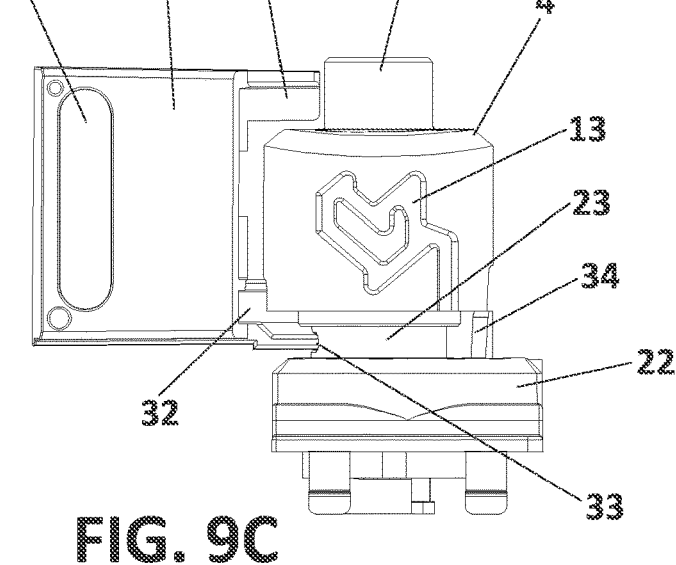

As more clearly represented in FIG. 8C, in the internal end of the latch (16), there is an upper extension (31) at an upper part thereof, and a lower extension (32) at a lower part thereof, both extensions provided to lock the plunger (4) as represented in FIGS. 9A-9C.

In the unlocked position of FIGS. 8A, 9B, when the latch (16) is distanced from the plunger (4), the plunger (4) is allowed to move axially. In contrast, in the locked position of FIGS. 8B, 9C, when the latch (16) is close to the plunger (4), the upper extension (31) is placed above the plunger (4), and the lower extension (32) can pass through the plunger (4) and through and opening (33) formed at neck (23), thereby, impeding axial displacement of the plunger (4) and knob rotation, thus, the knob cannot be detached.

When the plunger (4) is in its upper position, the upper extension (31) prevents the latch from being inserted to its locked position, in order to avoid safety failures (otherwise the operator could place the padlock and think that the system is safe, when in fact the knob could be removed).

Figure 10:
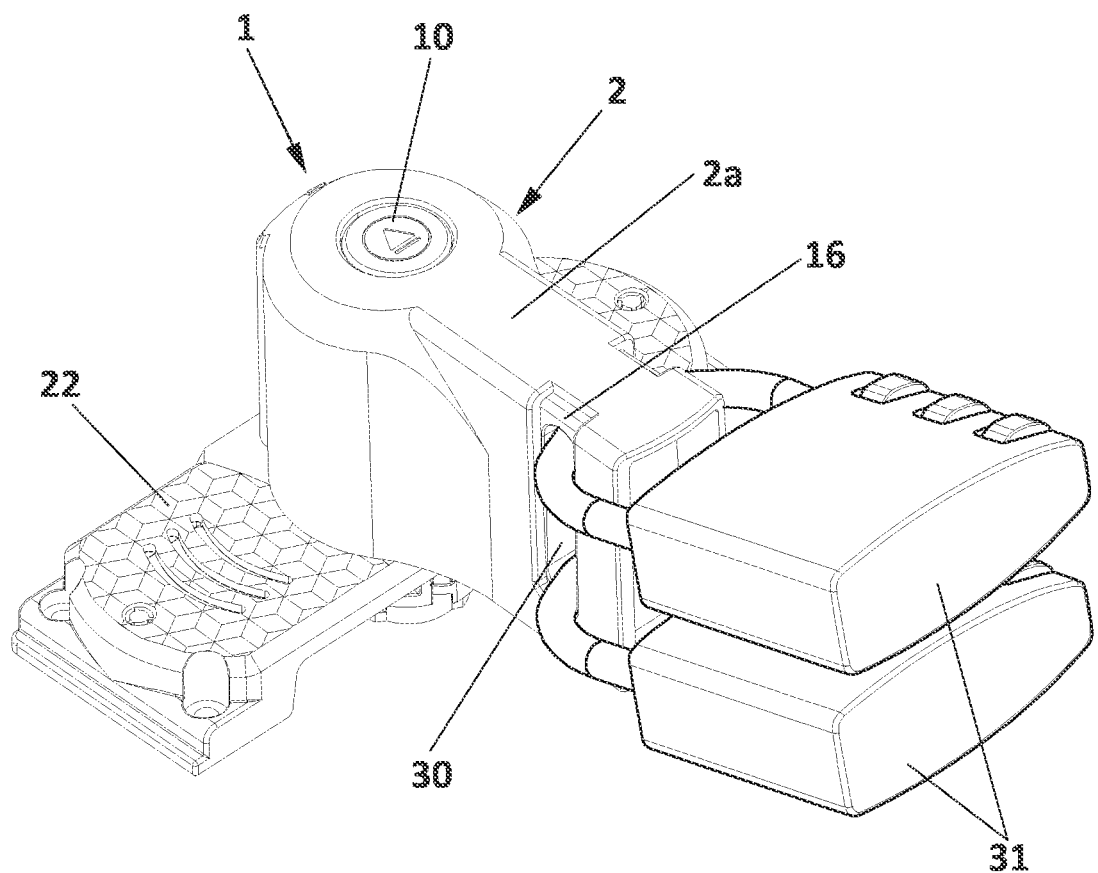
FIG. 10.—shows a perspective view of the knob housing and the lack blocked by lockers.

In this way, the plunger (16) can only be moved to locked position and the knob locked, when the detachable knob (1) is in its Off position shown in FIG. 10. When padlocks (31) are installed as shown in FIG. 10, the plunger (4) cannot be pressed-down (and consequently, the detachable knob cannot be detached), and the detachable knob (1) cannot be rotated (thus, a switching device to which the knob is coupled, cannot be turned On, being locked in the Off position).

Figure 11:
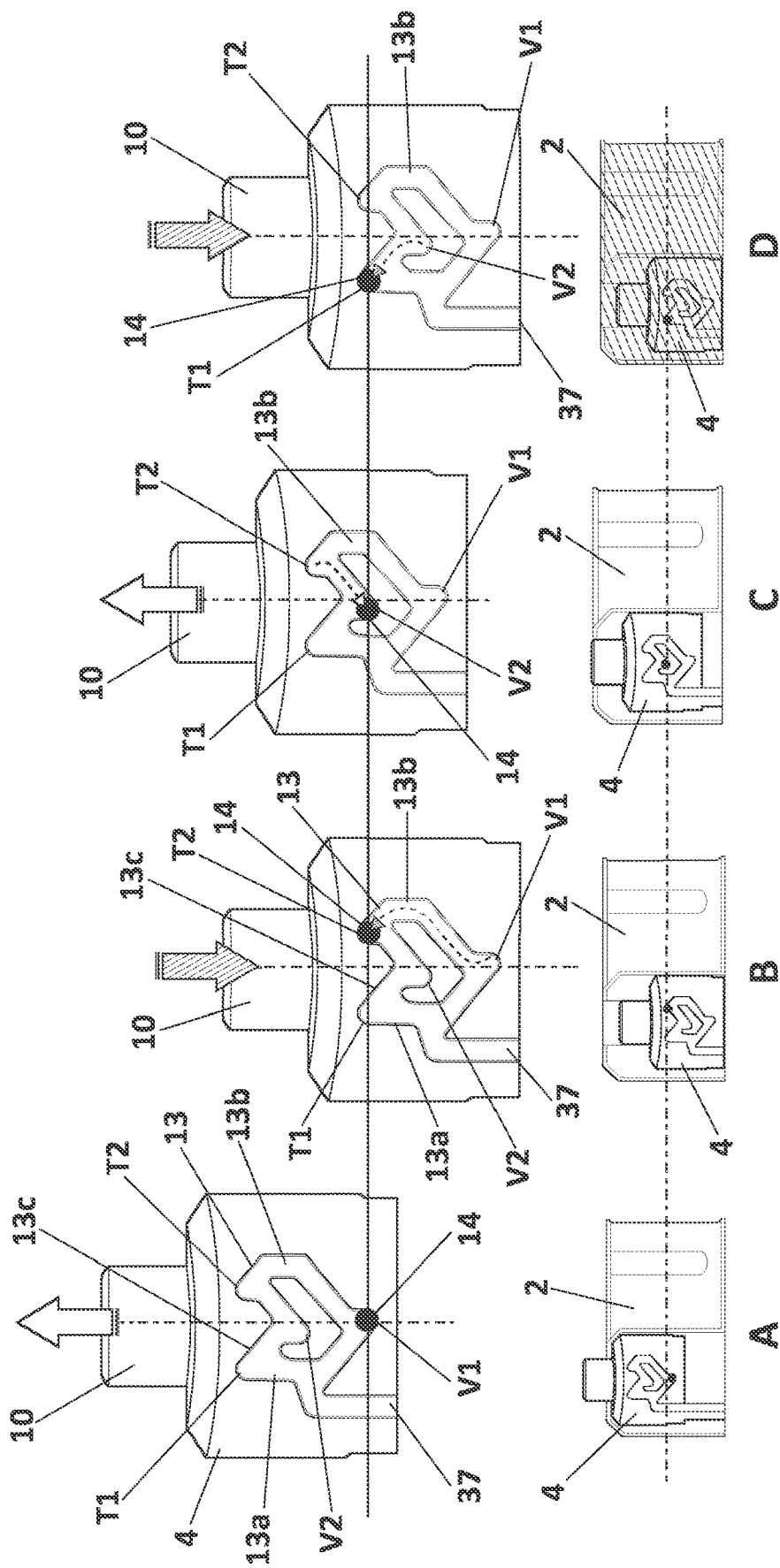
FIG. 11.—shows a sequence of elevational views of the plunger and the ball, with different axial positions of the plunger, and wherein arrows indicate the movement direction of the plunger in each figure. The sequence of figures illustrates how the ball moves along the groove of the plunger to perform the bi-estable operation of the plunger. A horizontal line at the top part of the figures, shows that the ball does not move axially, it only moves horizontally along that line. At the bottom of the figures, it is shown the position of the plunger in the knob housing for each position. The movement of the ball is indicated by a dotted line arrow.

FIG. 11 illustrates how the bi-stable pulsation mechanism operates. The bi-stable operation is achieved by at least one ball (14) and at least one groove (13) formed on the external surface of the plunger (4) (and on an internal surface of the knob housing). Preferably, there are two grooves (13,13') and two balls (14,14') at diametrically opposing sides of the plunger (4).

Each of the second grooves (13,13') has the form of a closed loop, having a bottom valley (V1) and a top valley (V2) placed above the bottom valley (V1) (they are vertically aligned), and an ascending path (13a) and a descending path (13b), both paths communicating the bottom and top valleys (V1,V2). The two valleys (V1,V2) are configured to retain the ball (14) inside each valley such that the ball (14) retains the plunger (4) in an axial permanent position against the force exerted by the compression spring (6).

Additionally, each groove (13) has two high points (T1, T2) both located at the same high and above the top valley (V2). Each to the two valleys and the two high points, has the form of an elbow as to retain temporaly the ball as shown in the sequence of FIG. 11.

The ascending path (13b) communicates the bottom valley (V1) with a first high point (T2), and the descending path (13a) communicates the other high point (T1) with the bottom valley (V1). The ascending path (13b) has two branches, an inclined branch that departs from the bottom valley (V1), and a vertical branch the extends from the inclined branch to the high point (T2). Similarly, the descending path (13a) has two branches, an inclined branch that departs from the bottom valley (V1), and a vertical branch the extends from the inclined branch to the other high point (T1).

An intermediate path (13c) communicates the two high points (T1,T2) with the top valley (V2), and it has two branches that are inclined with respect to each other, one branch communicates the top valley (V1) with the high point (T2), and the other branch communicates the top valley (V1) with the other high point (T1).

In FIG. 11 the horizontal line represents the first groove (12) formed internally in the knob housing (2), and as it can be appreciated, the ball only moves horizontally within the groove (12).

With this configuration of the groove (13), the bi-stable operation of the ball as the plunger (4) is pushed-down, is as follows:

When the ball (14) is retained in one of the valleys (V1,V2) FIGS. 11A, 11C, it defines a stable position of the plunger (4), in which the ball is retained inside a valley and the plunger (4) is retained in a stable position.

From first stable position of FIG. 11A to (T2): when the plunger (4) is pressed-down, the ball (14) moves horizontally and along the ascending path (13b) (as the plunger moves downwards) as indicated by the dotted arrow in FIG. 11B until it reaches unstable position (T2), at which point the plunger (4) is stopped. The bottom valley (V1) is slightly misaligned to the right, so that the ball is prevented from running through the ascending path (13a).

From (T2) to second stable position of FIG. 11B: with the ball in (T2) when the user stops pressing the plunger (4), due to the biasing force of the spring (6), the plunger (4) is moved upwards (FIG. 11C) and the ball runs along one of the branches of the intermediate path as indicated by the botted arrow of FIG. 11C, thereby reaching the second stable position.

From second stable position of FIG. 11C to (T1): when the plunger is pressed-down again, the ball runs along the other branch of the intermediate path (13c) as indicated by dotted arrow in FIG. 11D, until it reaches unstable position (T1).

From T1 to first stable position of FIG. 11A: once the ball in T2 and when the user stop pressing the plunger, by the simple action of the spring (6), the plunger (4) ascend forcing the ball to run down the descending path (13a) until it settles in the bottom valley (V1) of FIG. 11A. Here it should be noted that the top valley (V2) is misaligned to the left, so the ball in the position of FIG. 11C, it is prevented from running towards the ascending path (13b).

As explained above, the valleys, paths, corners of the groove (13) are designed, such that the ball can only travel according to the route described above, but not in opposite direction.

Figure 12:
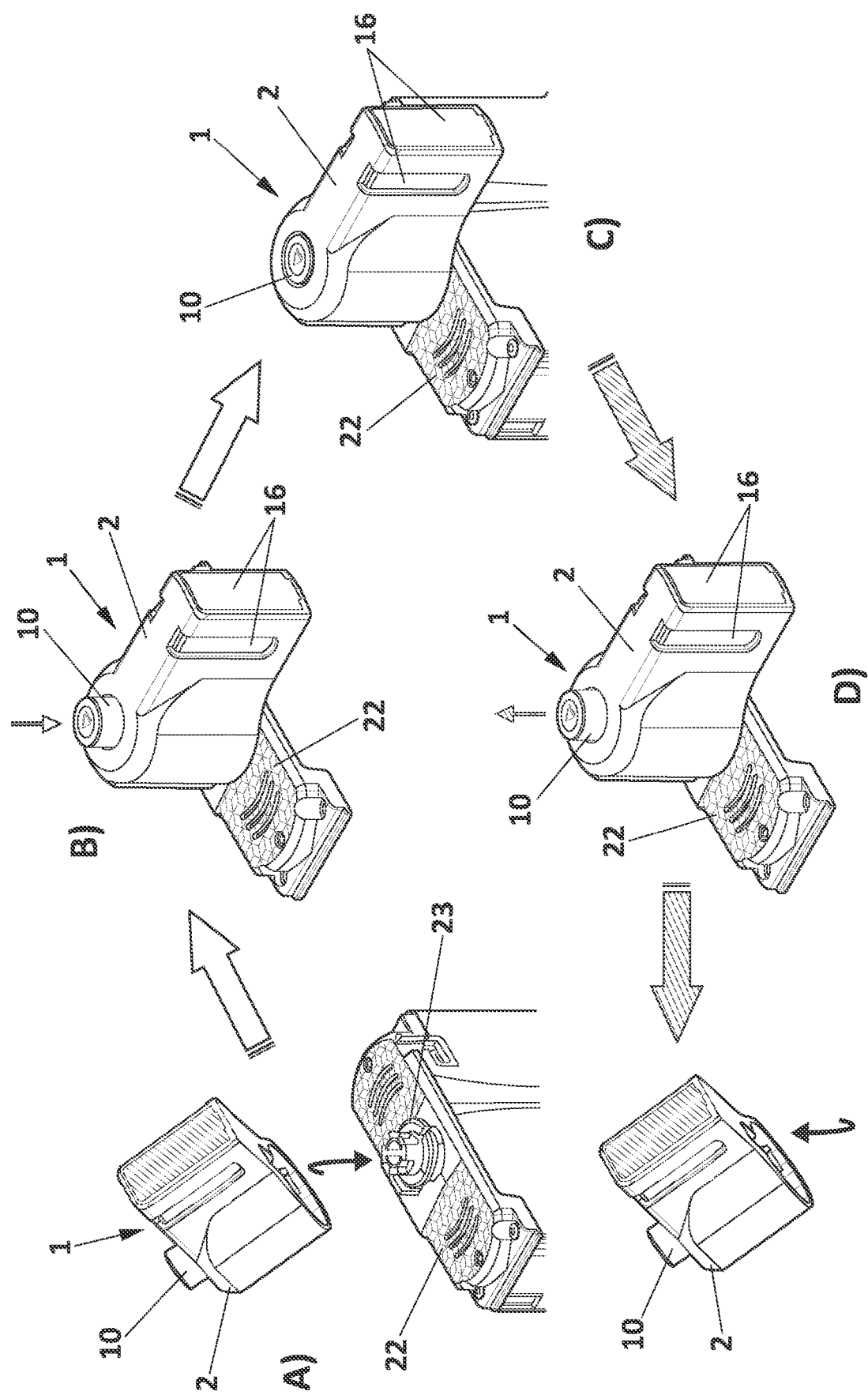
FIG. 12.—shows a sequence of several perspective views (A-D) of the coupling between the knob housing and the cover, and how it is used. Arrows indicate the order of the sequence.

With the structure described above, the use of the detachable knob (1) is illustrated in FIG. 12, and it is as follows:

FIG. 12A. First, the detachable knob (1) is clipped with the neck (23) od a cover (22) of a switching device, as explained above by slightly pressing the knob against the neck (23) in the correct clipping position as shown in the Figure, in particular in the switched-Off position. At this stage, the knob is in its unlocked position, that is, the plunger (4) is in its upper position.

FIGS. 12B, 12C. Once clipped, a user press-down the cylindrical neck (10) (push-button) to move the plunger (4) downwards to engage or lock the knob (1) with the neck (23) and the cover (22). In this position, the plunger remains in its engaged stable position, and the knob (1) can be rotated to switch On and Off the switching device as shown in the sequence of FIGS. 14A-14F.

FIG. 12D, 12A. when an inspection or maintenance work has to carried out, the knob is rotated to its Off position of FIG. 12D, and then the cylindrical neck or push-button (10), is pushed down so the plunger moves to its upper disengaged position (FIG. 12A), and the knob can be removed. With the knob removed, the cover (22) can be taken off and the switching device cannot be operated.

Figure 13A:
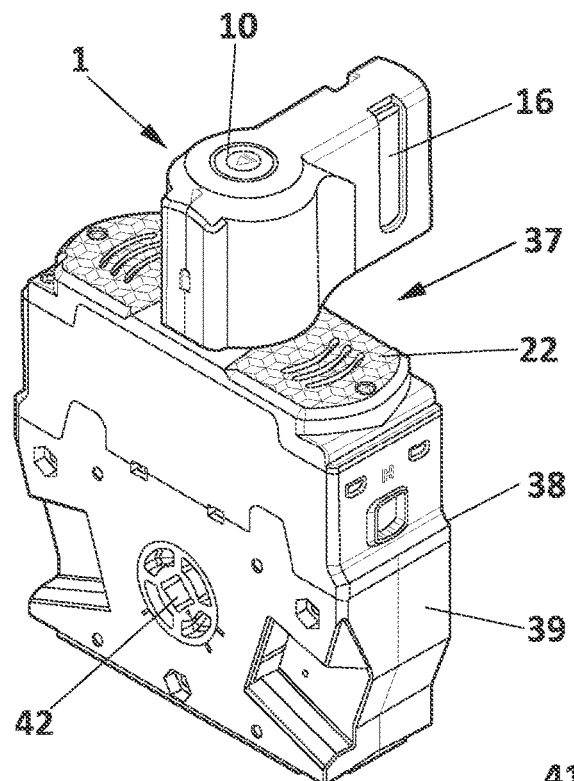
FIG. 13.—shows several perspective views of the knob housing coupled with a switching device.
Figure 13B:
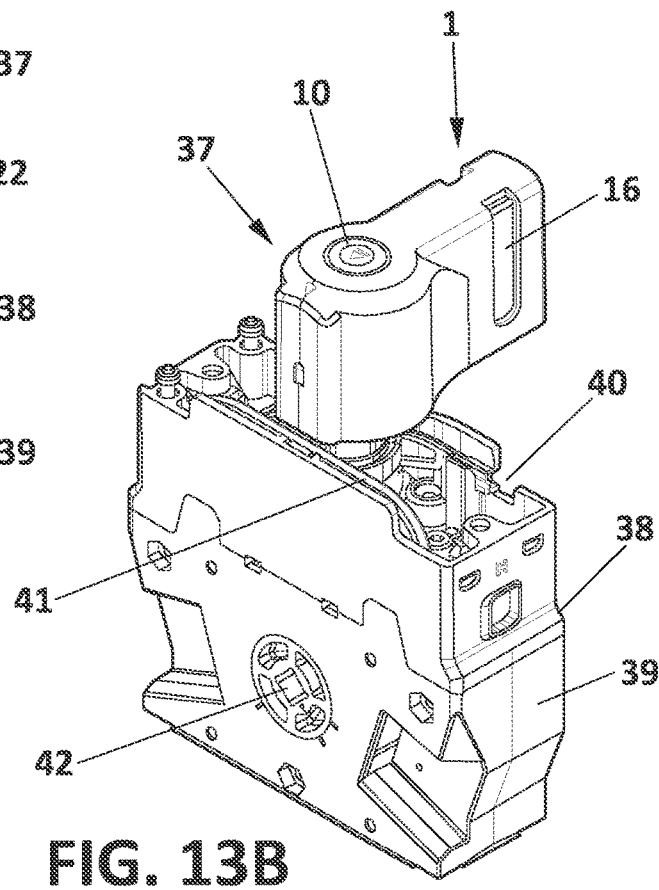
Figure 13C:
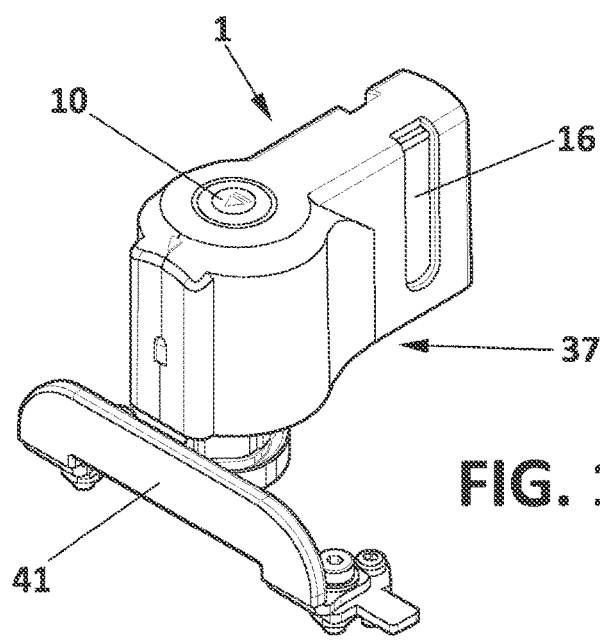
Figure 14A:
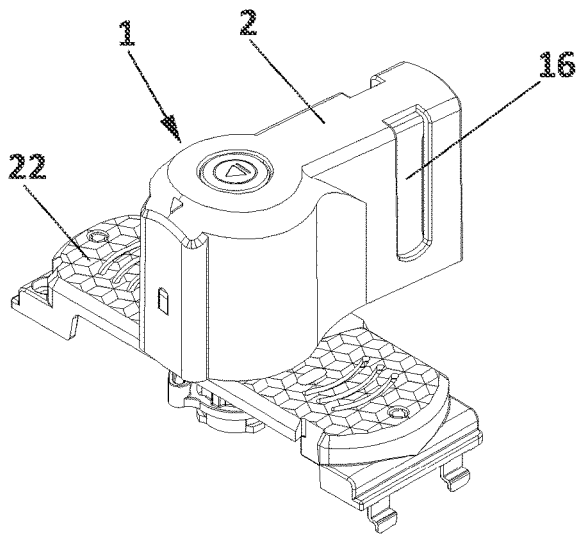
FIGS. 14A, 14C and 14E are perspective views.
Figure 14B:
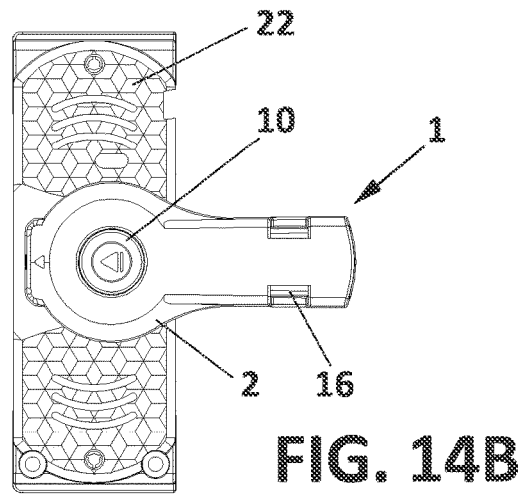
FIGS. 14B, 14D and 14F are top plan views corresponding to the positions of the previous perspective views.
Figure 14C:
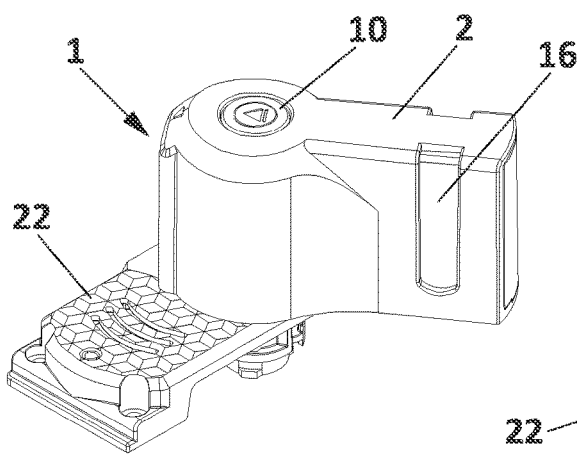
Figure 14D:
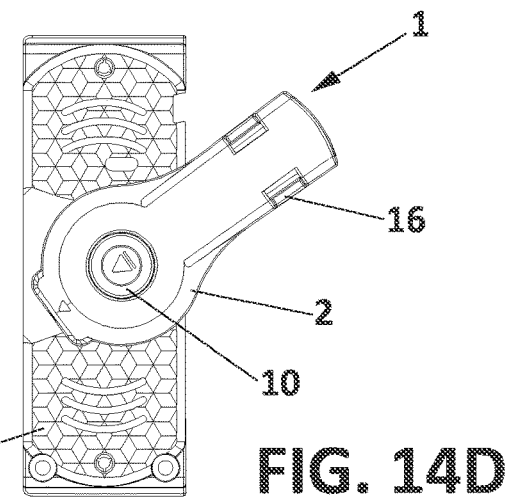
Figure 14E:
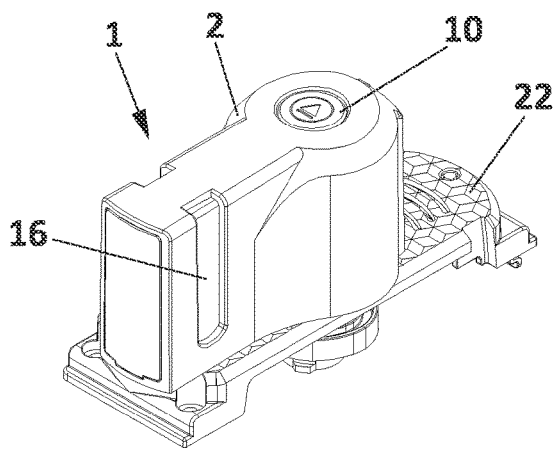
Figure 14F:
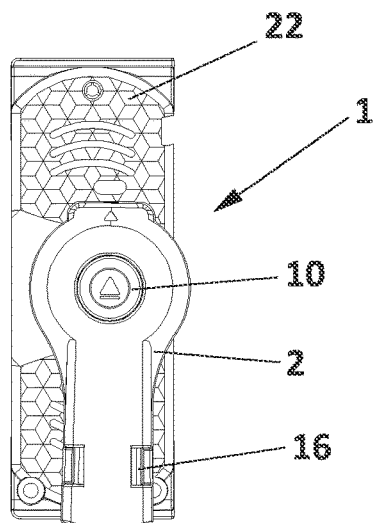

Another aspect of the invention is the switchgear module (37) represented in FIGS. 13A-13C, that comprises the detachable knob (1) previously described and a switching device (38). The switching device (38) has a housing (39) having an aperture (40) providing access to the housing (39) interior, and a cover (22) removably mounted with the housing (39) closing the aperture (40).

A disconnectable switch member (41), for example a metallic plate screwed to an internal support within the housing, is enclosed inside the housing (39), and a switch actuation mechanism (42) is enclosed, at least in part, inside the housing (39).

The detachable knob (1) is arranged above the cover (22) and it is detachably connected with the switch actuation mechanism (42) through the cover (22) and by means of the drive shaft (27), such that the knob (1) impede removal of the cover (22) when the knob (1) is coupled with the module (37). Therefore, the cover (22) can be removed and the housing interior accessed only when the detachable knob (1) is detached from the actuation mechanism (42), for example, in order to remove the disconnectable switch member (41).

As explained above, the detachable knob (1) is reversibly rotatable between a switched-On position (when the switching device (38) is switched-On) and a switched-Off position (when the switching device (38) is switched-Off) to operate the switch actuation mechanism, and detachable knob is configured to be detachable in the switched-Off position and to impede detachment in its switched-On position.

Figure 16A:
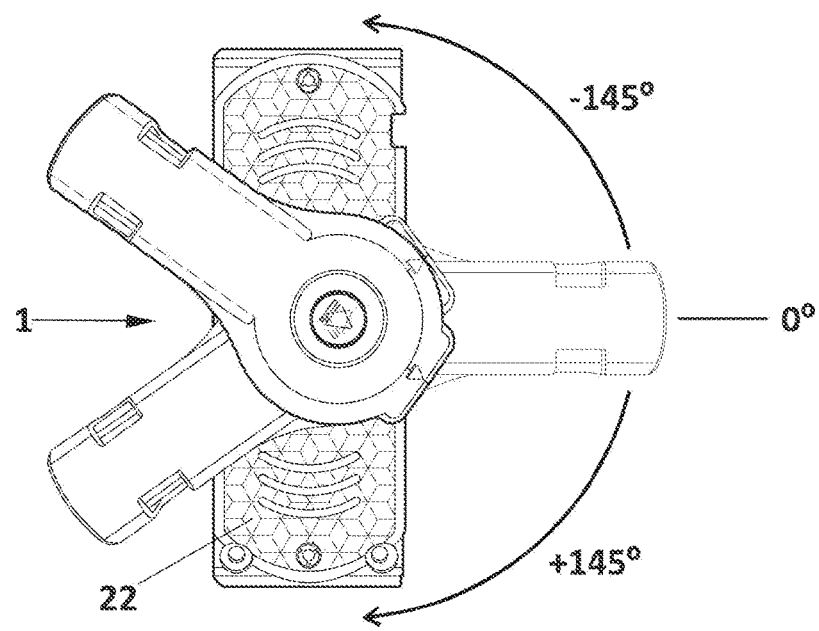
FIG. 16A is a top plan view of a coupling position between the knob housing and a multi-pole array of switches.

As represented in FIG. 16A, the detachable knob (1) can be rotated about axis "X", up to 290° (±145° from the coupling position (0°) free of restrictions. This means that it can be used to operate switch actuation mechanisms with 2, 3, 4 . . . or as many positions as desired, located in a range of 290°, without having to maintain a minimum angle between them.

The rotation angle is limited by the switch actuation mechanism to which the knob (1) is attached. That is, if for example the end position of the switch actuation mechanism are at 90°, the rotation of the knob (1) is restricted to those 90°.

The coupling position (marked with 0° angle in FIG. 16A) can be located wherever the switch actuation mechanism requires, that is, it is not necessary that it is in the horizontal, vertical, . . . etc. but it adapts to each particular switch actuation mechanism. From this coupling position, the knob can be turned a maximum of 145° clockwise and anti-clockwise as shown in FIG. 16A.

Figure 17A:
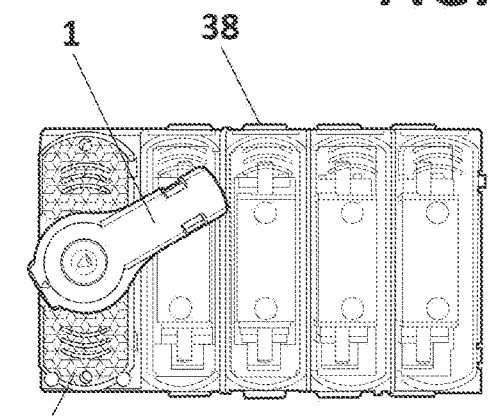
FIG. 17A is a first top plan view of a coupling position between the knob housing and a multi-pole array of switches.
Figure 16B:
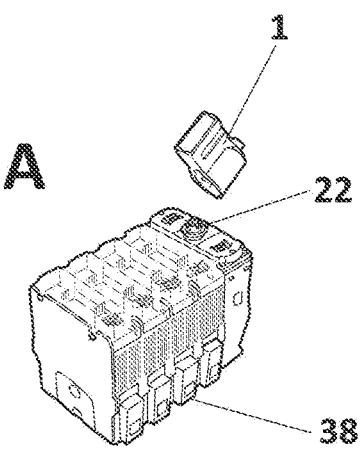
FIG. 16B is a perspective view of the knob housing and a multi-pole array of switches.
Figure 17B:
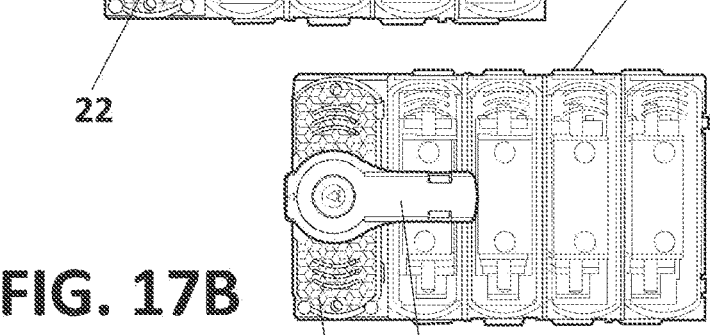
FIG. 17B is a second top plan view of a coupling position between the knob housing and a multi-pole array of switches.
Figure 17C:
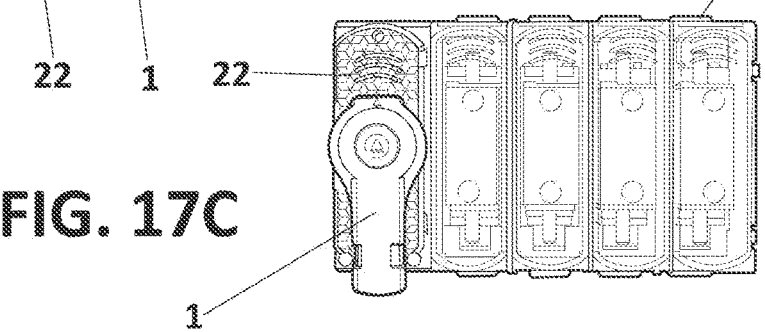
FIG. 17C is a third top plan view of a coupling position between the knob housing and a multi-pole array of switches.

An example of that feature of the knob (1) is shown in FIG. 17, when the knob is meant to operate a multi-pole switching device. The coupling position is horizontal, 0°, and the switching mechanism to operate has three positions, TEST (−30°) (FIG. 17A), OFF (0°) (FIG. 17B), and ON (90°) (FIG. 17C), with stable positions at −30° and 90°. Therefore, in this example the knob (1) can rotate 120° (−30°/+90°). As indicated in FIG. 17B, only in the horizontal 0° OFF position (when no current is circulating), the knob can be detached, whereas in any other position, the plunger can no be pushed-down and the knob cannot be removed.

The detachable knob with all its components, has been designed such that its assembly during its manufacturing process, is very simple in order to shorten assembly time. For this reason, all assembly can be carried out by means of clip joints so that the process is completely manual, that is, it does not require tools, which also has a positive impact on manufacturing cost.

During the assembly process, the knob housing (2) is positioned upside down (FIG. 2A), and the plunger (4) s housed inside.

Then, the two balls (14,14') are introduced through paths (37,37') formed at the plunger (4) and in the knob housing interior, through which the balls (14,14') reach the respective grooves (13,13').

Then, the spring (6) is placed and the crown (5) is clipped.

Finally, the latch (16) and its associated spring, are assembled.

Other preferred embodiments of the present invention are described in the appended dependent claims and the multiple combinations of those claims.

What is claimed is:

1. A detachable knob comprising:
   a knob housing configured to be manually rotated about a rotation axis "X",
   anchoring means placed inside the knob housing and configured to transit reversely between an engaged position and a disengaged position,
   a plunger arranged inside the knob housing and axially displaceable along the rotation axis "X", wherein the plunger is configured to bring the anchoring means from their engaged position to their disengaged position and vice versa,
   biasing means arranged inside the knob housing to axially bias the plunger away from the anchoring means,
   wherein the plunger is axially displaceable relative to the anchoring means between two stable axial positions at axis "X", a first stable axial position being a pushed-down position in which the plunger remains stable and force the anchoring means to their engaged or to their disengaged position, and a second stable axial position being a release position in which the plunger remains stable and in which the anchoring means are in the first stable axial position, and
   wherein the plunger is accessible from outside the housing to allow the plunger to be actuated pushed-down along axis "X", such that by pushing down the plunger, the plunger transits reversely between the first stable axial position and the second stable axial position.

2. A detachable knob according to claim 1, further comprising a crown co-axially mounted with the plunger along the rotation axis "X" inside the knob housing,
   wherein the crown is attached to the knob housing in a way that the crown and the knob housing are jointly rotatable,
   wherein the anchoring means are two or more flexible claws integrally formed with the crown, and
   wherein the claws can flex in a direction intersecting the axis "X".

3. A detachable knob according to claim 1,
   wherein the knob housing has a cylindrical chamber extending along the rotation axis "X",
   wherein the plunger has a cylindrical configuration and the plunger is received within that cylindrical chamber,
   wherein the knob housing has an open bottom base and an opening at a top part thereof, and wherein the plunger is accessible through the opening and the anchoring means are accessible through the open bottom base.

4. A detachable knob according to claim 2,
wherein the plunger has an open bottom base, and
wherein the plunger and the crown are configured such that in the pushed-down position of the plunger, the crown is received inside the plunger, and the plunger forces the claws to flex towards their engaged position.

5. A detachable knob according to claim 4,
wherein an external surface of the plunger and an internal surface of a cylindrical chamber are facing each other,
wherein the knob housing has at least one first groove provided on the internal surface of the cylindrical chamber,
wherein the plunger has at least one second groove provided on the external surface, and the knob has a ball received within the first and second grooves, such that the ball can roll along the first and second grooves upon displacement of the plunger,
wherein the first groove lies on a plane orthogonal to the axis "X" such that axial displacement of the ball is prevented, and
wherein the second groove has the form of a closed loop.

6. A detachable knob according to claim 5,
wherein the second groove has a first valley and a second valley placed above the first valley, and an ascending path and a descending path, both paths communicating the first and second valleys, and
wherein the valleys are configured to retain the ball inside the respective valley such that the ball retains the plunger in an axial permanent position against the force exerted by the biasing means.

7. A detachable knob according to claim 5,
wherein the plunger is axially displaceable relative to the anchoring means between two stable axial positions at axis "X", a first stable axial position being a pushed-down position in which the plunger remains stable and force the anchoring means to their engaged or to their disengaged position, and a second stable axial position being a release position in which the anchoring means remains stable and brings the anchoring means to their other position.

8. A detachable knob according to claim 2, wherein the biasing means is a compression spring, co-axially arranged about axis "X", between the plunger and the crown.

9. A detachable knob according to claim 1,
wherein the knob housing has a lateral level having an internal cavity providing access to the plunger,
wherein the knob further comprises a displaceable latch received within the cavity, and
wherein the latch is displaceable between a locked position in which the latch impedes plunger displacement, and an unlocked position in which plunger displacement is allowed.

10. A switchgear module comprising:
a module housing having an aperture providing access to an interior of the module housing,
a cover removably mounted with the module housing closing the aperture,
a disconnectable switch member enclosed inside the module housing,
a switch actuation mechanism enclosed, at least in part, inside the housing,
a detachable knob arranged above the cover and detachably connected with the switch actuation mechanism through the cover, such that the knob impedes removal of the cover when the knob is coupled with the module, and the cover can be removed and the housing interior accessed when the detachable knob is detached from the actuation mechanism;
anchoring means placed inside the knob housing and configured to transit reversely from an engaged position in which they are able to attach the knob with a part of a switchgear, to a disengaged position in which the anchoring means detach the knob from the part of a switchgear;
the detachable knob comprising
a knob housing configured to be manually rotated about a rotation axis "X",
anchoring means placed inside the knob housing and configured to transit reversely between an engaged position and a disengaged position,
a plunger arranged inside the knob housing and axially displaceable along the rotation axis "X", wherein the plunger is configured to bring the anchoring means from their engaged position to their disengaged position and vice versa,
biasing means arranged inside the knob housing to axially bias the plunger away from the anchoring means,
wherein the plunger is axially displaceable relative to the anchoring means between two stable axial positions at axis "X", a first stable axial position being a pushed-down position in which the plunger remains stable and force the anchoring means to their engaged or to their disengaged position, and a second stable axial position being a release position in which the plunger remains stable and in which the anchoring means are in the other position, and
wherein the plunger is accessible from outside the housing to allow the plunger to be actuated pushed-down along axis "X", such that by pushing down the plunger, the plunger transits reversely between the first stable axial position and the second stable axial position.

11. A module according to claim 10,
wherein the detachable knob is reversibly rotatable between a switched-on position and a switched-off position to operate the switch actuation mechanism, and
wherein the detachable knob is configured to be detachable in the switched-off position and to impede detachment in its switched-on position.

12. A module according to claim 10, wherein the disconnectable switch member is a metal plate.

13. A module according to claim 10,
wherein the cover has an opening and a neck extending around the neck,
wherein the anchoring means are configured to engage with the neck in their engaged position, and
wherein the detachable knob is coupled with the switch mechanism through that opening.

14. A module according to claim 10,
further comprising a rotatable shaft received with the opening,
wherein the shaft is coupled with the switch mechanism, and
wherein a crown is configured to couple and uncouple with the shaft.

* * * * *